United States Patent [19]

Saito et al.

[11] Patent Number: 4,554,605
[45] Date of Patent: Nov. 19, 1985

[54] MODE SETTING DEVICE OF A MAGNETIC TAPE DRIVING APPARATUS

[75] Inventors: Shoichi Saito; Kazumi Miyazi, both of Tokyo, Japan

[73] Assignee: Olympus Optical Co., Ltd., Tokyo, Japan

[21] Appl. No.: 408,413

[22] Filed: Aug. 16, 1982

[30] Foreign Application Priority Data

Aug. 25, 1981 [JP] Japan ............................ 56-133001
Sep. 7, 1981 [JP] Japan ........................ 56-132763[U]

[51] Int. Cl.[4] ............................................. G11B 5/008
[52] U.S. Cl. ................................................ 360/96.1
[58] Field of Search ............... 360/96.1, 96.3, 96.4; 242/193–194, 197, 199, 200

[56] References Cited

U.S. PATENT DOCUMENTS 3,488,058 1/1970 Staar ........................... 360/96.4 X
3,930,269 12/1975 Uemura ......................... 360/96.3
4,225,894 9/1980 Fulukawa ..................... 360/96.3 X

FOREIGN PATENT DOCUMENTS 3012196 10/1980 Fed. Rep. of Germany .
55-4761 1/1980 Japan .

Primary Examiner—A. J. Heinz
Attorney, Agent, or Firm—Frishauf, Holtz, Goodman and Woodward

[57] ABSTRACT

A mode setting device for establishing various driving modes in a magnetic tape driving apparatus, comprises a cam member, and a cam guide member guided by the cam member to be shifted between a plurality of positions. And a brake member and a pinch roller are located in positions corresponding to a plurality of magnetic tape driving modes as the cam guide member is shifted between the plurality of positions.

4 Claims, 18 Drawing Figures

MODE SETTING DEVICE OF A MAGNETIC TAPE DRIVING APPARATUS

BACKGROUND OF THE INVENTION

This invention relates to a mode setting device for establishing in a magnetic tape driving apparatus various driving modes, such as fast-forward, fast rewinding, cue, review, playback, stop, and pause modes.

A mode setting device of a prior art magnetic tape driving apparatus is so constructed that a brake member and a pinch roller associated with mode setting are shifted to positions for establishing a mode corresponding to a depressed one among a plurality of mode setting switches by directly using the force applied to the depressed mode setting switch. Alternatively, the mode setting switches are coupled with an electric switch, which performs two-position control of a plunger so that the brake member and pinch roller are shifted to the positions where the mode corresponding to the depressed mode setting switch is established.

The aforementioned conventional construction requires a relatively great force for mode setting and produces a relatively high noise at mode setting. The need of the great force disables people of less strength, such as women, children, old people, etc., from operating the magnetic tape driving apparatus with ease, and leads to increased mode setting time. The production of the high noise should destroy the atmosphere before or after enjoying information, e.g., music, reproduced from a magnetic tape in a tape cassette where the magnetic tape driving apparatus is a cassette deck.

SUMMARY OF THE INVENTION

This invention is contrived in consideration of these circumstances, and is intended to provide a mode setting device of a magnetic tape driving apparatus capable of mode setting without requiring any great force and without producing any substantial noise.

The above object of this invention may be attained by a mode setting device for establishing various driving modes in a magnetic tape driving apparatus, which comprises a cam member and a cam guide member guided by the cam member to be shifted between a plurality of positions, and is so constructed that a brake member and a pinch roller are located in positions corresponding to a plurality of magnetic tape driving modes as the cam member is shifted between the plurality of positions.

Conventionally known is a mode setting device which establishes various driving modes including a stop mode in a magnetic tape driving apparatus, utilizing movement of a cam guide member movable between first and second positions guided by the cam member.

In this conventional setting device, the movement of the cam guide member caused by the cam member is continuous, so that the various driving modes set by the movement of the cam guide member are sure to be established in predetermined sequence. Accordingly, in a mode setting device which successively establishes the stop mode, the cue or review mode (a kind of the fast-forward or fast rewinding mode), and the playback mode as the cam guide member moves in one direction, the playback mode cannot immediately be established in the magnetic tape driving apparatus which is in the stop mode. Before the stop mode is reached, the cue or review mode need be established temporarily. When the cam guide member moves in the other direction, the stop mode cannot directly follow the playback mode.

In the driving mode setting device of this type, reel shafts and capstan are not driven for rotation, and only the pinch roller, magnetic head, and brake member pass their respective positions for the cue or review mode while switching between the stop and playback modes is being performed.

In the driving mode setting device mentioned above, therefore, the time and labor for switching between two driving modes, e.g., the stop and playback modes, can be saved by minimizing the total amount of operations of the pinch roller, magnetic head, brake member, and various other members associated with the magnetic tape driving mode setting during the switching between the two driving modes.

Accordingly, the mode setting device of this invention preferably further comprises a pinch roller operating member separating the pinch roller from a magnetic tape when the cam guide member is located in a first position thereof, and bringing the pinch roller into contact with the magnetic tape when the cam guide member is located in a second position thereof, and a brake operating member movable between a first position to stop rotation of reel shafts and a second position to allow the reel shafts to rotate so that the brake operating member is located in the first position thereof when the cam guide member is located in the first position thereof, and is located in the second position thereof when the cam guide member is moved between the first and second positions thereof or is located in the second position thereof.

With this construction, the total amount of operations of the various members associated with the magnetic tape driving mode setting during switching between two driving modes can be minimized.

Now an embodiment of this invention will be described with reference to the accompanying drawings.

DETAILED DESCRIPTION OF THE PREFERRED EMBODIMENT

Figure 1:
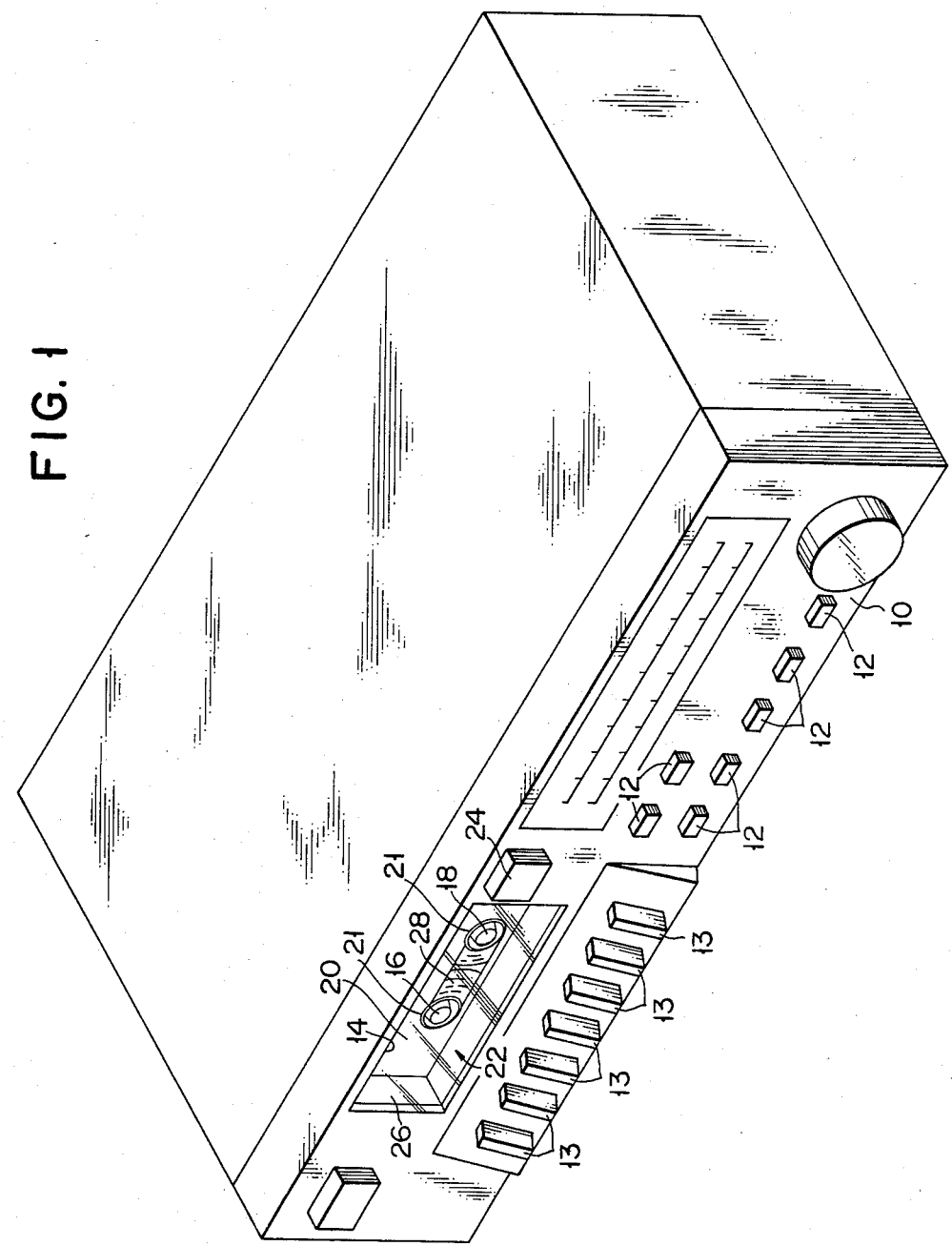
FIG. 1 is a perspective view of a magnetic tape driving apparatus with a mode setting device according to an embodiment of this invention.

FIG. 1 shows a magnetic tape driving apparatus with a mode setting device according to an embodiment of this invention. In this embodiment, the magnetic tape driving apparatus is a cassette deck of a component-type stereo. Arranged on a vertical front face 10 of the housing of the magnetic tape driving apparatus are a plurality of operation switches 12 for establishing in the apparatus various operation modes not relating to the running of a magnetic tape, such as recording mode, and a plurality of switches 13 for establishing in the apparatus various tape running modes relating to the running of a magnetic tape, such as fast-forward, fast rewinding, cue, review, playback, pause, and stop modes.

A tape cassette holding cavity 14 is formed in the front face 10 of the housing.

Arranged in the tape cassette holding cavity 14, as shown in FIG. 1, are a pair of reel shafts 16 and 18 which extend at right angles to the front face 10. The tape cassette holding cavity 14 contains therein a tape cassette 20, which has a pair of reel hubs 21 mounted individually on the reel shafts 16 and 18.

In this embodiment, the tape cassette 20 is a micro cassette as it is called. The tape cassette 20 is detachably held by an ejecting device 22 which is housed in the tape cassette holding cavity 14. That face of the housing of the tape cassette 20 held by the ejecting device 22 in which five magnetic head-pinch roller insertion openings are formed looks substantially vertically downward as in FIG. 1.

The ejecting device 22 can move between a first position where the reel hubs 21 of the tape cassette 20 are mounted on the reel shafts 16 and 18 in the tape cassette holding cavity 14, as shown in FIG. 1, and a second position where the reel hubs 21 are disengaged from the reel shafts 16 and 18 so that the tape cassette 20 is exposed to the outside space through the housing of the magnetic tape driving apparatus.

The ejecting device 22 has an ejection switch 24 protruding outward from the front face 10 of the housing of the magnetic tape driving apparatus.

If the ejection switch 24 is depressed, an ejection mode is established in the magnetic tape driving apparatus, and the ejecting device 22 moves from the first position to the second position. The tape cassette 20 located in its second position by the ejecting device 22 can be removed from and held by the ejecting device 22. The ejecting device 22 in its second position can be returned to its first position by depression.

The ejecting device 22 has a faceplate 26, which is located flush with the front face 10 of the housing of the magnetic tape driving apparatus when the ejecting device 22 is in the first position, as shown in FIG. 1. In this state, the faceplate 26 covers the opening of the tape cassette holding cavity 14 to form part of the front face 10 of the housing. The faceplate 26 is arranged substantially parallel to those two faces of the housing of the tape cassette 20 which support the pair of reel hubs 21 for rotation.

Figure 2:
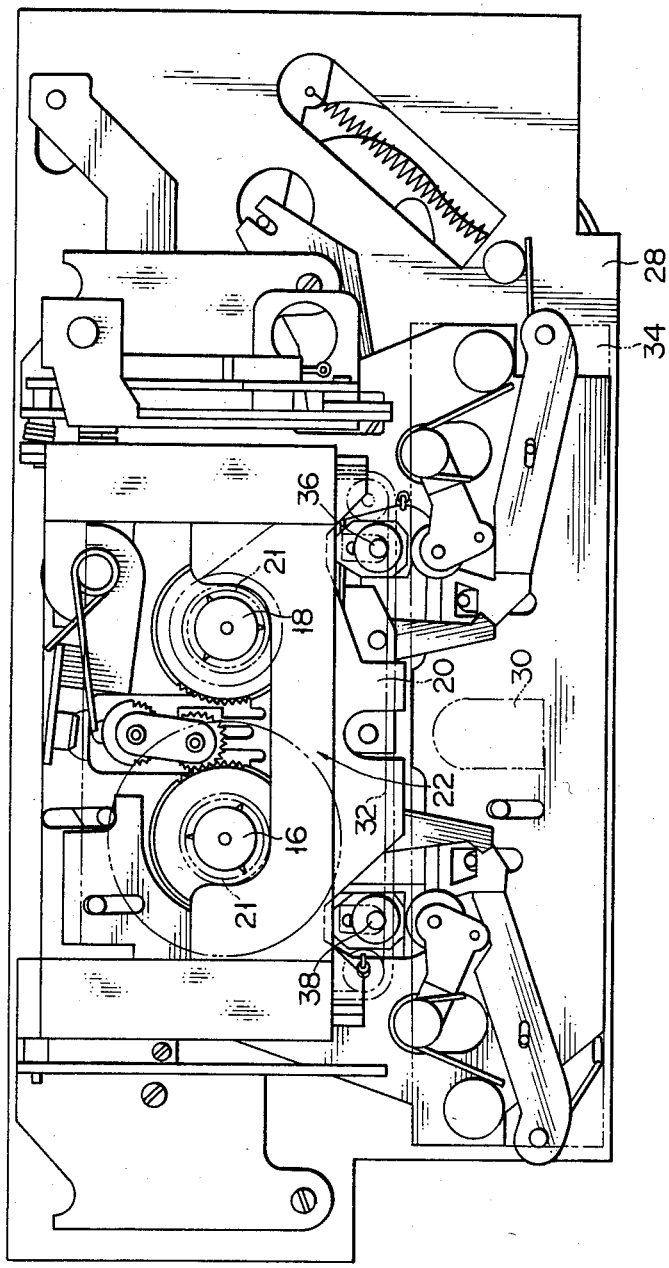
FIG. 2 is a front view showing principal mechanisms of the magnetic tape driving apparatus.

FIG. 2 shows mechanisms inside the housing of the magnetic tape driving apparatus. The internal mechanisms include a chassis 28 which is disposed substantially parallel to the front face 10 of the housing.

As shown in FIG. 2, the pair of reel shafts 16 and 18 protrude from the chassis 28. Also, the chassis 28 is fitted with the ejecting device 22 detachably retaining the tape cassette 20.

A monitor head 30 is located directly under the central or third one of the five magnetic head-pinch roller insertion openings of the housing of the tape cassette 20 which is held in its first position by the ejecting device 22. In this embodiment, the monitor head 30 is an erasing head to use AC current, facing a magnetic tape 32 in the tape cassette 20 through the central insertion opening.

A recording head (not shown) is located directly under the second insertion opening of the housing of the tape cassette 20 immediately on the left of the central insertion opening. The recording head faces the magnetic tape 32 through the second insertion opening.

A reproducing head (not shown) is located directly under the fourth insertion opening immediately on the right of the central insertion opening. The reproducing head faces the magnetic tape 32 through the fourth insertion opening.

It is generally known that pressure-contact pads (not shown) are disposed individually in the second and fourth magnetic head-pinch roller insertion openings immediately on the left and right of the central insertion opening, and are in contact with the back of the magnetic tape 32.

The monitor head 30 and the recording and reproducing heads are attached to a magnetic head supporting base 34 located ahead of the front of the chassis 28.

Figure 3:
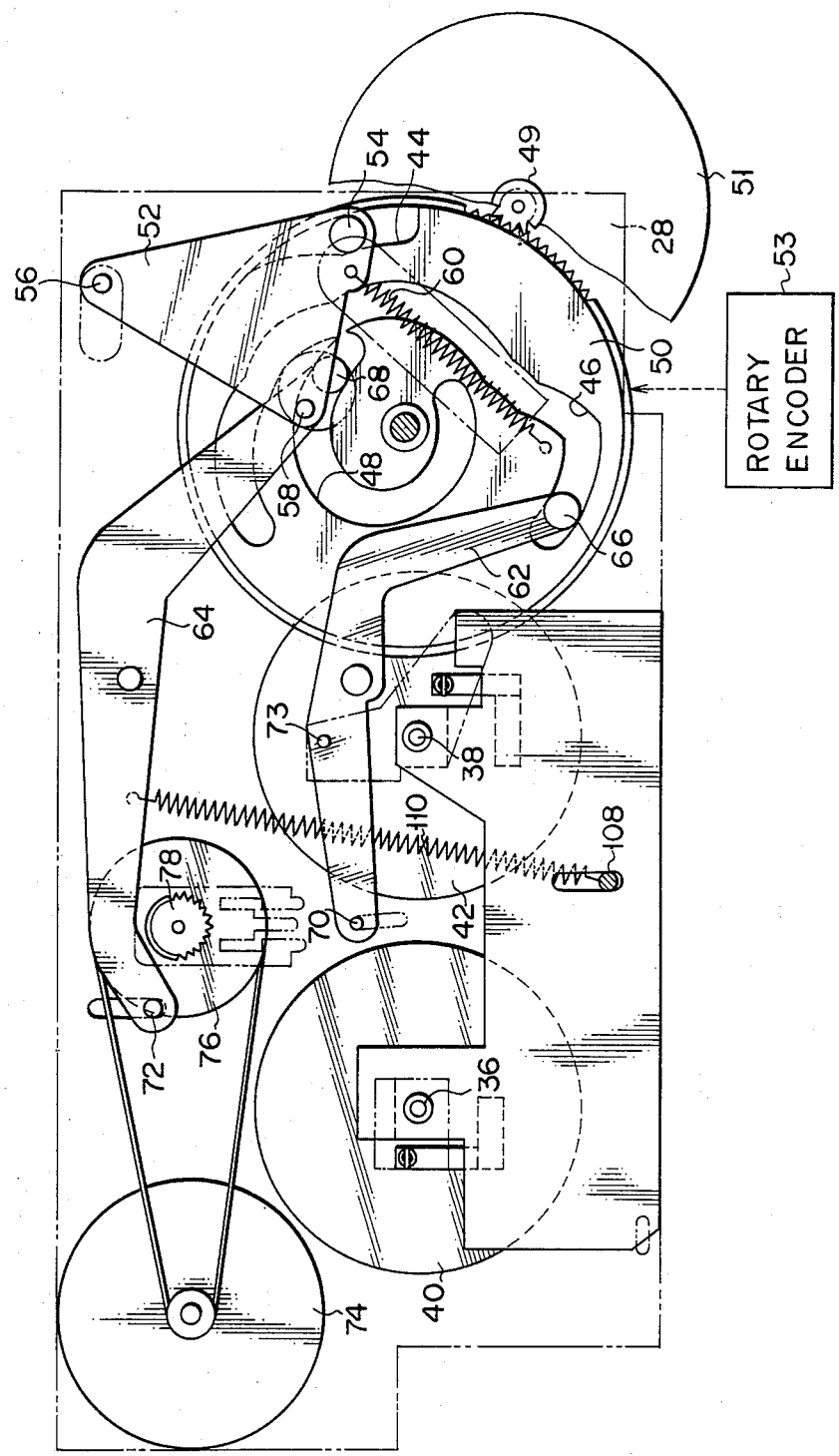
FIG. 3 is a front view on the same side as FIG. 2 showing components arranged on the back side of a chassis shown in FIG. 2.

The chassis 28 is fitted with a pair of capstans 36 and 38 for rotation, which protrude forward from the chassis 28, as shown in FIG. 2. At the back of the chassis 28, as shown in FIG. 3, the capstans 36 and 38 are coaxially coupled with flywheels 40 and 42, respectively. An endless belt (not shown) is stretched between the outer peripheral surfaces of the flywheels 40 and 42 and the output shaft of a first electric motor (not shown). Thus, the capstans 36 and 38 are selectively rotated in one and the other directions at equal speeds by the first motor. This indicates that the magnetic tape driving apparatus of this embodiment is of a dual capstan system.

As shown in FIG. 3, a cam member 50 having first to third guide grooves 44, 46 and 48 are rotatably mounted on the back of the chassis 28. The cam member 50 is coupled with a second electric motor 51 by conventional rotation transmission means 49, such as a gear, to be rotated thereby in one and the other directions. The cam member 50 is also coupled with rotation position detecting means 53, e.g., a rotary encoder.

A triangular first cam guide member 52 is provided on the back of the chassis 28. The substantially central portion of the first cam guide member 52 is rotatably attached to the back of the chassis 28.

A first vertex portion of the first cam guide member 52 is fitted with a first pin 54, which is fitted in the first guide groove 44 of the cam member 50.

Second and third vertex portions of the first cam guide member 52 are fitted with second and third pins 56 and 58, respectively, which are fitted individually in openings in the chassis 28 to project on the front side of the chassis 28.

The first cam guide member 52 is urged to rotate in the clockwise direction of FIG. 3 by urging means 60 fixed to the chassis 28. Driven by the rotatory force applied to the first cam guide member 52, the first pin 54 of the first cam guide member 52 moves along the first guide groove 44 of the cam member 50.

Second and third cam guide members 62 and 64 are also arranged on the back of the chassis 28. The second and third cam guide members 62 and 64 are rotatably attached to the back of the chassis 28 at their substantially central portions as their axes of rotation.

First pins 66 and 68 are attached to respective one end portions of the second and third cam guide members 62 and 64.

The first pin 66 of the second cam guide member 62 is fitted in the second guide groove 46 of the cam member 50.

The first pin 68 of the third cam guide member 64 is fitted in the third guide groove 48 of the cam member 50.

Second pins 70 and 72 are attached to the respective other end portions of the second and third cam guide members 62 and 64. The second pins 70 and 72 of the second and third cam guide members 62 and 64 are fitted individualy in openings in the chassis 28 to project on the front side of the chassis 28.

The second cam guide member 62 is also provided with a third pin 73 which projects on the front side of the chassis 28 through an opening formed in the chassis 28.

Also mounted on the back of the chassis 28, as shown in FIG. 3, are a third electric motor 74 and a pulley 76 which is coupled with the output shaft of the third motor 74 by conventional rotation transmission means such as an endless belt. A first small gear 78 is coaxially fixed to the pulley 76 to project on the front side of the chassis 28 through an opening therein.

Figure 4:
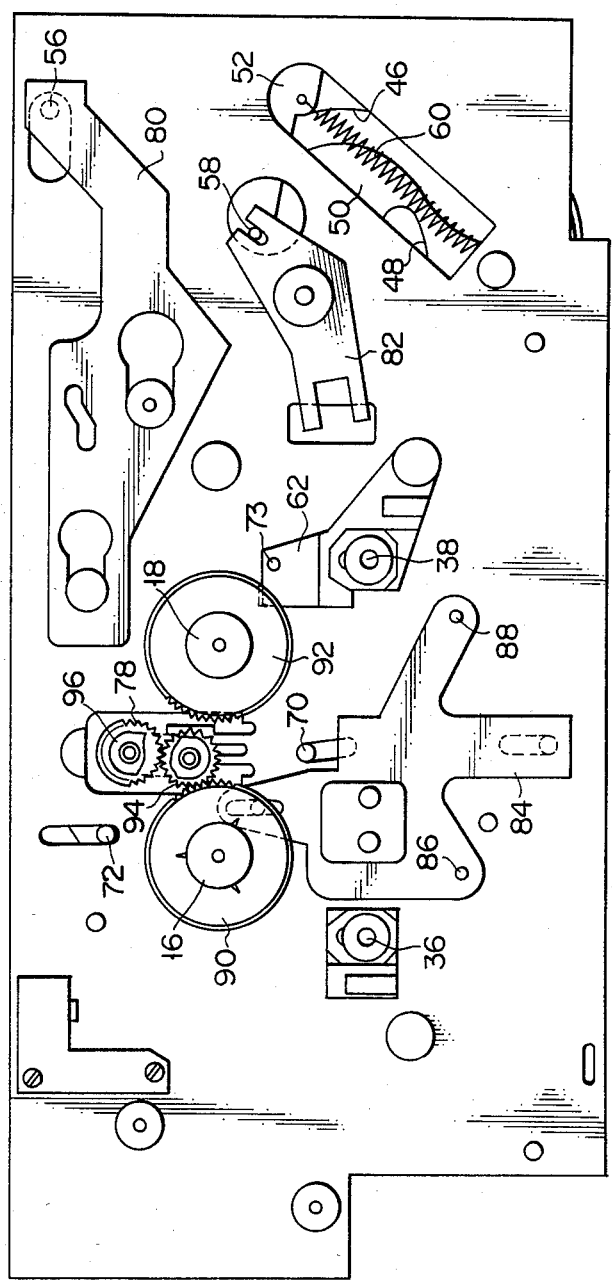
FIG. 4 is a front view on the same side as FIG. 2 selectively showing some of components arranged on the front side of the chassis.

As shown in FIG. 4, first, second and third linkage levers 80, 82 and 84 are arranged on the front of the chassis 28.

The first linkage lever 80 is attached to the chassis 28 so as to be able to move horizontally with the aid of conventional guide means, such as a combination of a guide pin and a guide hole. One end portion of the first linkage lever 80 is fixed to the second pin 56 of the first cam guide member 52.

The second linkage lever 82 is rotatably attached to the front of the chassis 28 at its substantially central portion as its axis of rotation. One end portion of the second linkage lever 82 is coupled with the third pin 58 of the first cam guide member 52 so as to be rotatable relatively to the third pin 58.

The third linkage lever 84 is vertically movably attached to the front of the chassis 28. The third linkage lever 84 has first and second pins 86 and 88 spaced horizontally.

Gears 90 and 92 are coaxially fixed to the basal parts of the reel shafts 16 and 18, respectively.

A second small gear 94 is in mesh with the first small gear 78. The first and second small gears 78 and 94 are coupled by means of a coupling plate 96.

The second small gear 94 is located between the gear 90 on the left-hand reel shaft 16 and the gear 92 on the right-hand reel shaft 18.

The gears 90 and 92 are located on the locus of movement of the second small gear 94 around the first small gear 78.

An auxiliary gear (not shown) is coaxially rotatably disposed under the gear 92 on the right-hand reel shaft 18. The gear 92 and the auxiliary gear are coupled by means of a frictional engagement member (not shown).

Figure 5:
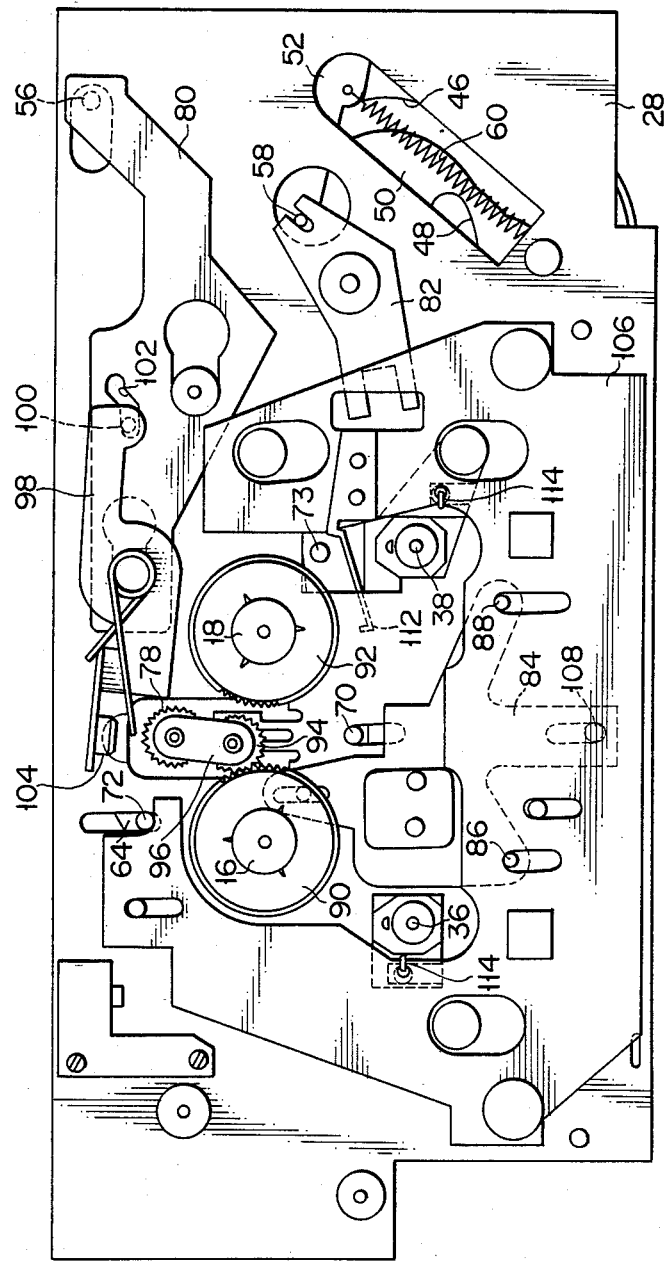
FIG. 5 is a front view on the same side as FIG. 2 showing the components shown in FIG. 4 plus some of the remaining components.

As shown in FIG. 5, a fourth linkage lever 98 is also provided on the front of the chassis 28. The fourth linkage lever 98 is attached to the front of the chassis 28 at its substantially central portion as it axis of rotation.

A pin 100 is fixed to one end portion of the seventh lever 98. The pin 100 is fitted in a guide hole 102 formed in the first linkage lever 80.

A tape cassette pushing section 104 is attached to the other end portion of the fourth linkage lever 98.

An auxiliary chassis 106 is disposed on the front of the chassis 28. The auxiliary chassis 106 is attached to the chassis 28 so as to be movable vertically parallel to the front of the chassis 28.

The auxiliary chassis 106 has a pin 108 which is fitted in an opening formed in the chassis 28 and protrudes backward from the back of the chassis 28. As shown in FIG. 3, the pin 108 is coupled with one end of urging means 110. The other end of the urging means 110 is coupled with the third cam guide member 64.

The magnetic head supporting plate 34 shown in FIG. 2 is fixed to the front of the auxiliary chassis 106.

As shown in FIG. 5, the auxiliary chassis 106 has an engaging claw 112 which is located under the auxiliary gear. The second pin 72 of the third cam guide member 64 abuts against the upper edge of the auxiliary chassis 106.

The other end portion of the second linkage lever 82 intersects an opening formed in the auxiliary chassis 106. In this embodiment, the second linkage lever 82 is an ejecting device operating lever for operating the ejecting device 22.

The auxiliary chassis 106 is coupled with one end of urging means 114, the other end of which is fixed to the back of the chassis 28 through an opening therein. The auxiliary chassis 106 is pressed against the front of the chassis 28 by the urging means 114.

The first and second pins 86 and 88 of the third linkage lever 84 are fitted individually in openings formed in the auxiliary chassis 106 to project forward from the front of the auxiliary chassis 106.

Figure 6:
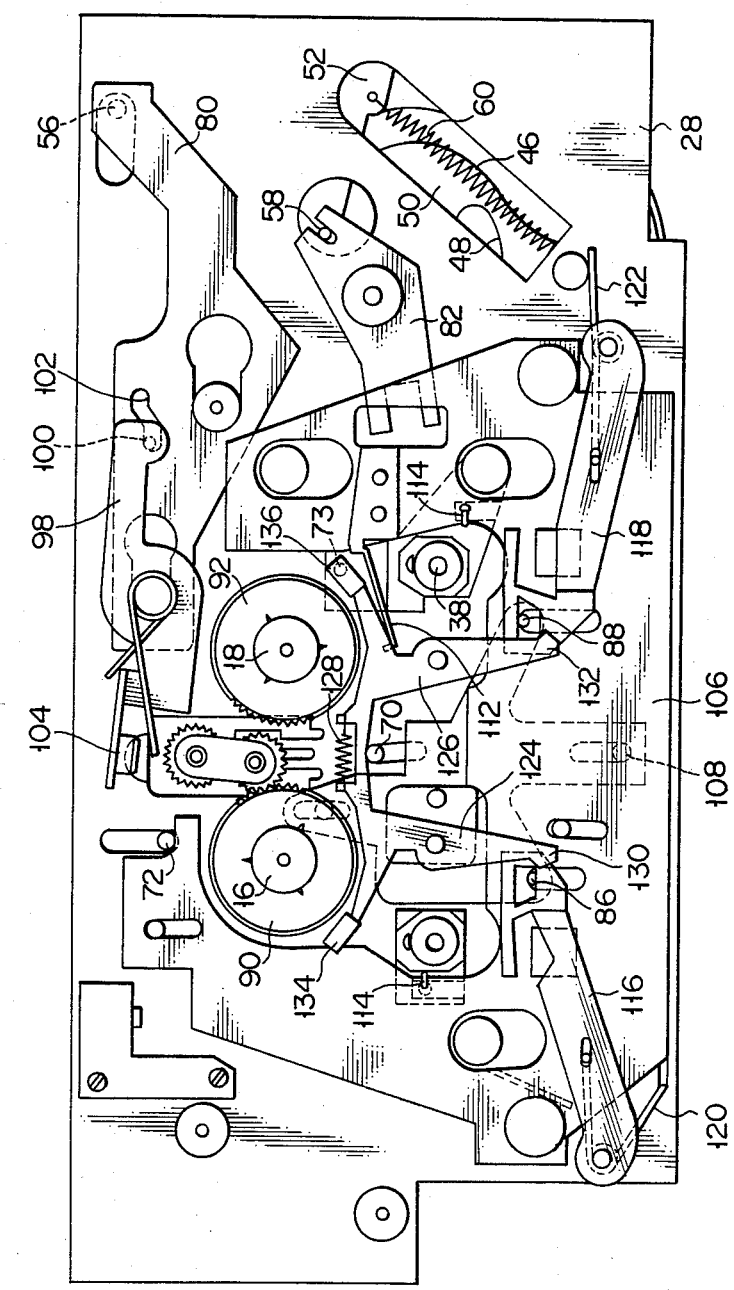
FIG. 6 is a front view on the same side as FIG. 2 showing the components shown in FIG. 5 plus some of the still remaining components.

As shown in FIG. 6, fifth and sixth linkage levers 116 and 118 are arranged on the front of the chassis 28. Respective one end portions of the fifth and sixth linkage levers 116 and 118 are attached to the front of the chassis 28 so that the levers 116 and 118 can rotate around their respective one end portions and parallel to the front of the chassis 28. The other end portions of the fifth and sixth linkage levers 116 and 118 extend over the front of the auxiliary chassis 106. An opening is formed in the other end portion of each of the fifth and sixth linkage levers 116 and 118.

The first pin 86 of the third linkage lever 84 is fitted in the opening in the other end portion of the fifth linkage lever 116. The first pin 86 is in contact with the lower edge of the opening of the fifth linkage lever 116.

The second pin 88 of the third linkage lever 84 is fitted in the opening in the other end portion of the sixth linkage lever 118. The second pin 88 is in contact with the upper edge of the opening of the sixth linkage lever 118.

The fifth linkage lever 116 is urged to rotate in the counterclockwise direction of FIG. 6 by conventional urging means 120 such as a torsion coil spring. The sixth linkage lever 118 is urged to rotate in the clockwise direction of FIG. 6 by conventional urging means 122 such as a torsion coil spring.

On the front of the chassis 28, first and second brake levers 124 and 126 are arranged under the left-and right-hand reel shafts 16 and 18, respectively.

The middle portions of vertically extending sections of the first and second brake levers 124 and 126 are attached to the front of the chassis 28 so that the first and second brake levers 124 and 126 can rotate parallel to the chassis 28 around the middle portions.

Right- and leftwardly extending sections protrude from the upper ends of the vertically extending sections of the first and second brake levers 124 and 126, respectively.

The right end portion of the rightwardly extending section of the first brake lever 124 and the left end portion of the leftwardly extending section of the second brake lever 126 overlap each other along the horizontal direction of FIG. 6.

The rightwardly extending section of the first brake lever 124 and the leftwardly extending section of the second brake lever 126 are coupled and urged to approach each other by urging means 128.

The first and second brake levers 124 and 126 are urged to rotate in the clockwise and counterclockwise directions, respectively, of FIG. 6 by the urging force of the urging means 128.

The second pin 70 of the second cam guide member 62 abuts against the respective lower edges of the right end portion of the rightwardly extending section of the first brake lever 124 and the left end portion of the leftwardly extending section of the second brake lever 126.

A projection 130 is formed on the left edge of the lower end portion of the vertically extending section of the first brake lever 124.

A projection 132 is formed on the right edge of the lower end portion of the vertically extending section of the second brake lever 126.

Braking friction members 134 and 136 are fixed to the leftwardly extending section of the first brake lever 124 and the rightwardly extending section of the second brake lever 126, respectively.

Figure 7:
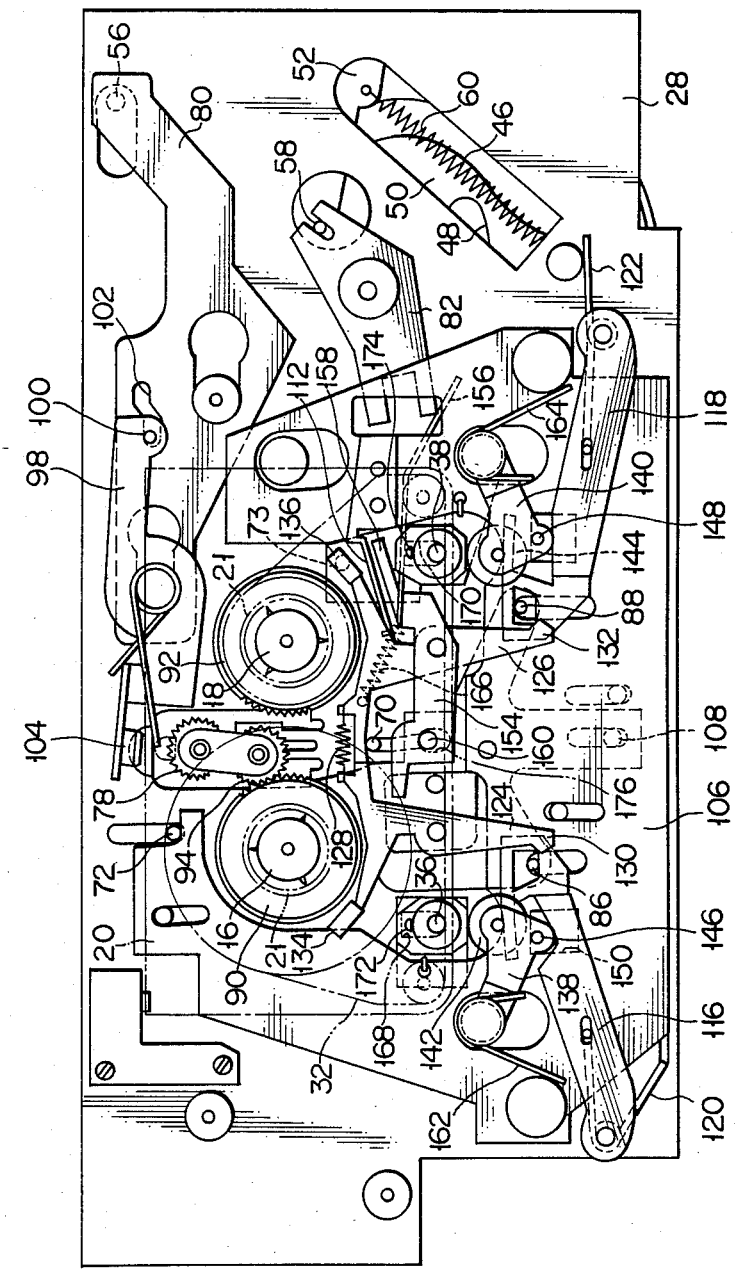
FIG. 7 is a front view on the same side as FIG. 2 showing the components shown in FIG. 6 plus all the remaining components.

As shown in FIG. 7, a pair of pinch roller retaining levers 138 and 140 are arranged on the front of the chassis 28. Respective one ends of the pinch roller retaining levers 138 and 140 are attached to the front of the chassis 28 so that the levers 138 and 140 can rotate parallel to the front of the chassis 28.

A pair of pinch rollers 142 and 144 are rotatably attached to the other ends of the pinch roller retaining levers 138 and 140, respectively. The pinch rollers 142 and 144 are located under the capstans 36 and 38, respectively.

Pins 146 and 148 are fixed to the one ends of the pinch roller retaining levers 138 and 140, respectively.

The pin 146 of the left-hand pinch roller retaining lever 138 abuts against the upper edge of the other end portion of the fifth linkage lever 116 and the upper edge of an opening 150 formed in the auxiliary chassis 106.

The pin 148 of the right-hand pinch roller retaining lever 140 abuts against the upper edge of the other end portion of the sixth linkage lever 118 and the upper edge of an opening 152 formed in the auxiliary chassis 106.

A seventh linkage lever 154 is also disposed on the front of the chassis 28. The middle portion of the seventh linkage lever 154 is attached to the chassis 28 so that the seventh linkage lever 154 can rotate parallel thereto.

First and second extending sections 156 and 158 protrude from one end portion of the seventh linkage lever 154. The first extending section 156 abuts against the lower edge of the other end portion of the second linkage lever 82.

A tape guide 160 in the form of a forwardly projecting pin is fixed to the other end portion of the seventh linkage lever 154.

A tape guide indentation is formed in the lower edge of the tape guide 160. The tape guide indentation has two end faces facing each other at a distance equal to the width of the magnetic tape 32.

The left-hand pinch roller retaining lever 138 is urged to rotate in the counterclockwise direction of FIG. 7 by conventional urging means 162 such as a torsion coil spring. The right-hand pinch roller retaining lever 140 is urged to rotate in the clockwise direction of FIG. 7 by conventional urging means 164 such as a torsion coil spring.

The urging forces of the urging means 162 and 164 for the pinch roller retaining members 138 and 140 are smaller than those of the urging means 120 and 122 for the fifth and sixth linkage levers 116 and 118.

The seventh linkage lever 154 is urged to rotate in the clockwise direction of FIG. 7 by conventional urging means 166 such as a tension coil spring.

There will now be described the operation of the dual-capstan magnetic tape driving apparatus with the mode setting device according to the aforementioned embodiment of this invention.

When the reel hubs 21 of the tape cassette 20 detachably held by the ejecting device 22 are mounted on the reel shafts 16 and 18, as shown in FIG. 2, the capstans 36 and 38 are inserted in a pair of tape cassette positioning pin insertion holes 168 and 170, respectively, as shown in FIG. 7.

A pair of tape cassette positioning pins 172 and 174 fixed to the front of the chassis 28 just above the capstans 36 and 38 are also inserted in the tape cassette positioning pin insertion holes 168 and 170, respectively.

The tape guide 160 is inserted in a capstan insertion hole 176 of the tape cassette 20.

At this time, the tape cassette pushing member 104 of the fourth linkage lever 98 is located above the housing of the tape cassette 20, and is not in contact with the housing.

The pinch rollers 142 and 144 are located below the capstans 36 and 38, facing the magnetic tape 32 in the tape cassette 20 through the two magnetic head-pinch roller openings thereof on the left and right end sides, respectively.

The tape guide 160 of the seventh linkage lever 154 is kept off the magnetic tape 32.

The recording head, the reproducing head, and the monitor head 30, which are mounted on the magnetic head supporting base 34 fixed to the auxiliary chassis 106, are also kept off the magnetic tape 32.

Accordingly, if the ejection switch 24 shown in FIG. 1 is depressed, the ejecting device 22 will be shifted from the first position where the reel hubs 21 of the tape cassette 20 are mounted on the reel shafts 16 and 18, as shown in FIG. 7, to the second position where the reel hubs 21 are disengaged from the reel shafts 16 and 18 so that the tape cassette 20 is projected from the housing of the magnetic tape driving apparatus into the outside space through the opening of the tape cassette holding cavity 14.

The position of the cam member 50 at this time is a first position of the cam member. Also, the positions of the first to third cam guide members 52, 62, 64 at this time are first position thereof, respectively.

FIG. 7 shows a state in which the ejection mode is established in the magnetic tape driving apparatus.

It is to be noted that in this state the first and second braking friction members 134 and 136 of the first and second brake levers 124 and 126 are off the left- and right-hand reel shafts 16 and 18, respectively. This indicates that the reel shafts 16 and 18 are allowed to rotate while the magnetic tape driving apparatus is in the ejection mode.

Accordingly, the reel shafts 16 and 18 can rotate even if engaged projections of at least one of the reel hubs 21 and engaging projections of at least one of the reel shafts 16 and 18 are brought into contact along the moving direction of the ejecting device 22, that is, along the direction normal to the drawing plane of FIG. 7 as the ejecting device 22, holding the tape cassette 20 with the magnetic tape 32 being wound around one of its reel hubs 21, is shifted from its second position to its first position. Thus, the reel hubs 21 of the tape cassette 20 can be mounted individually on the reel shafts 16 and 18 without elongating or loosening the magnetic tape 32 in the tape cassette 20.

Now let it be supposed that the fast-forward mode setting switch in the tape running mode setting switches 13 of the magnetic tape driving apparatus is depressed.

Then, the second motor 51 is rotated in the clockwise direction of FIG. 3 by an electric circuit (not shown) in the magnetic tape driving apparatus, so that the cam member 50 is also rotated clockwise. When the cam member 50 rotates to the position shown in FIG. 8, the rotation position detecting means 53 produces a fast-forward mode setting position signal. Receiving this signal, the electric circuit in the magnetic tape driving apparatus stops the rotation of the second motor 51. The position of the cam member at this time is a second position thereof.

Figure 8:
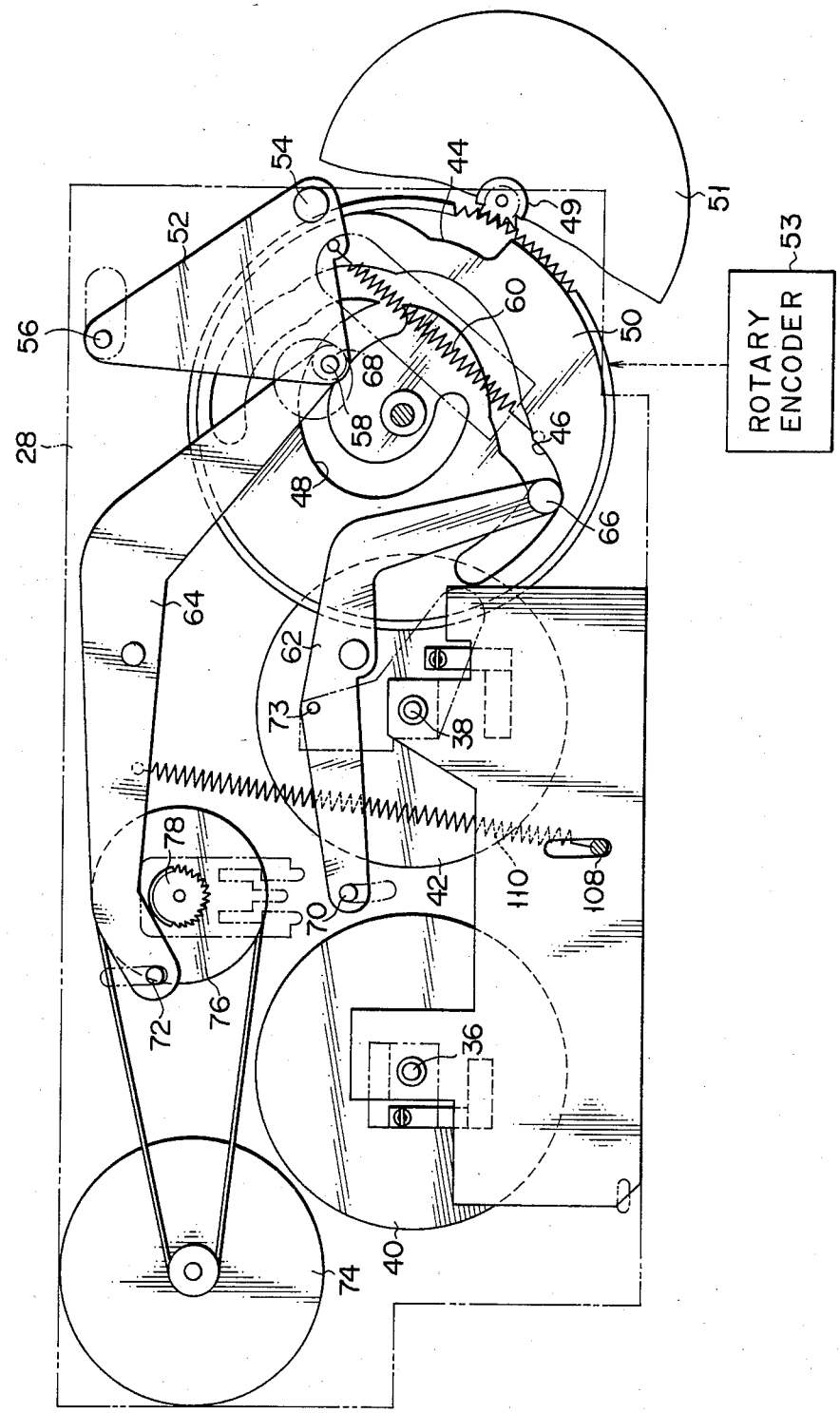
FIG. 8 is a front view similar to FIG. 3 showing a state in which a fast-forward or fast rewinding mode is established in the magnetic tape driving apparatus.

The moment the second motor 51 ceases to rotate, the third motor 74 starts to rotate the first small gear 78 in the clockwise direction of FIG. 8 at relatively high speed. In this case, the first motor is kept from rotating.

When the cam member 50 is located in the fast-forward mode setting position, as shown in FIG. 8, the first cam guide member 52, having its first pin 54 guided by the first guide groove 44, rotates in the counterclockwise direction of FIG. 3 against the urging force of the urging means 60.

At this time, the second and third levers 62 and 64 with their first pins 66 and 68 guided by the second and third guide grooves 46 and 48, respectively, do not rotate from the position shown in FIG. 3.

Figure 9:
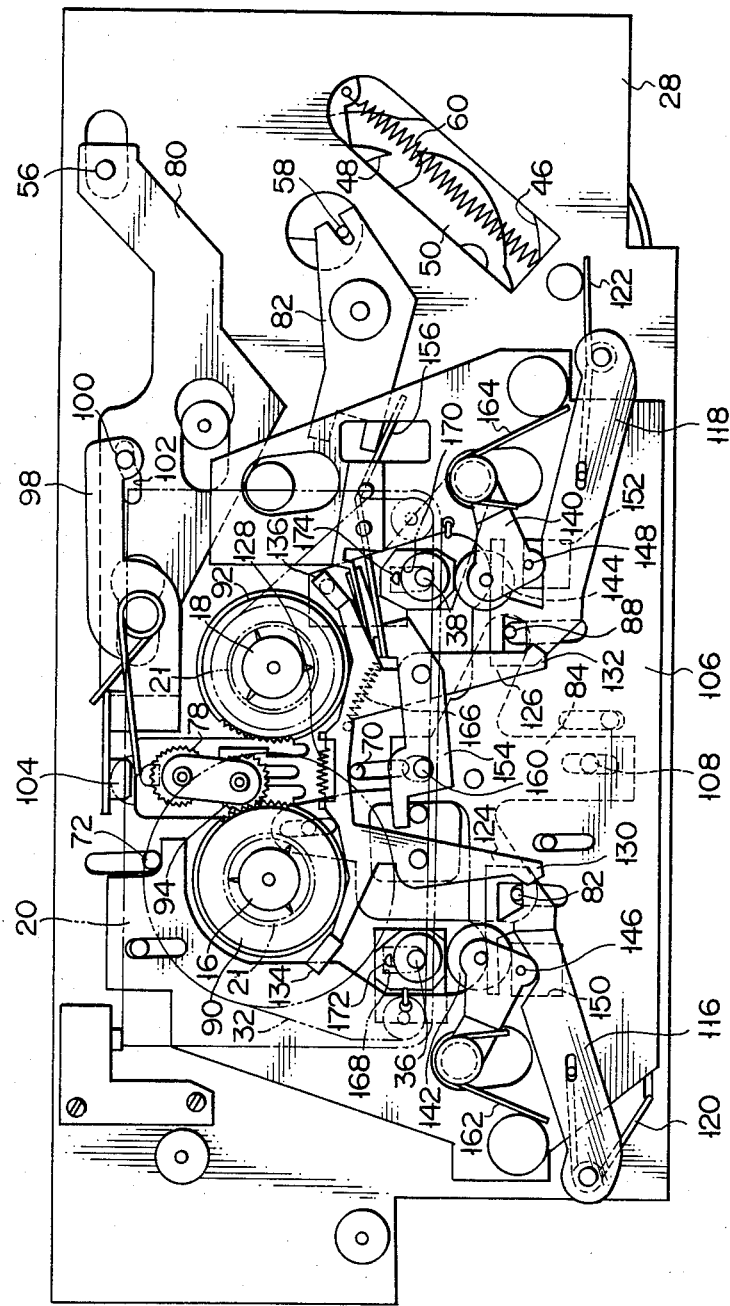
FIG. 9 is a front view similar to FIG. 7 showing the state in which the fast-forward or fast rewinding mode is established in the magnetic tape driving apparatus.

The first linkage lever 80 is moved to the left of FIG. 9 by the second pin 56 of the rotated first cam guide member 52. The fourth linkage lever 98 is rotated in the counterclockwise direction of FIG. 7 by the pin 100 which is guided by the guide hole 102 of the first linkage lever 80 thus moved to the left. As a result, the tape cassette pushing member 104 downwardly abuts against the housing of the tape cassette 20, as shown in FIG. 9. The position of the first cam guide member 52 at this time is a second position thereof. Then, the tape cassette 20 brings the upper edges of the tape cassette positioning pin insertion holes 168 and 170 into contact with the tape cassette positioning pins 172 and 174, respectively.

Meanwhile, the second linkage lever 82 is rotated clockwise from the position shown in FIG. 7 by the third pin 58 of the rotated first cam guide member 52. When the second linkage lever 82 rotates clockwise to be located in the position shown in FIG. 9, the ejecting device 22 shown in FIG. 2 is fixed to its first position.

As the second linkage lever 82 rotates in this manner, moreover, the seventh linkage lever 154 is rotated counterclockwise from the position shown in FIG. 7 by the urging force of the urging means 166. The tape guide 160 of the rotated seventh linkage lever 154 is brought into contact with the back of the magnetic tape 32, as shown in FIG. 9. At this time, the magnetic tape 32 is fitted in the tape guide indentation of the tape guide 160 so that the two end faces of the tape guide indentation is individually in contact with the two longitudinal edges of the magnetic tape 32.

The moment the tape guide 160 is touched by the magnetic tape 32 in the tape cassette 20, that is, the moment the cam member 50 is located in the fast-forward mode setting position shown in FIG. 8, the electric circuit of the magnetic tape driving apparatus causes the third motor 74 of FIG. 8 to rotate the first small gear 78 in the clockwise direction of FIG. 9 at relatively high speed. Then, the second small gear 94 is caused to mesh with the gear 90 on the left-hand reel shaft 16, as shown in FIG. 9, by the rotatory force of the first small gear 78. Thus, the left-hand reel shaft 16 is rotated in the clockwise direction of FIG. 9 at relatively high speed.

Having its two longitudinal edges in slide contact with the two end faces of the tape guide indentation of the tape guide 160, the magnetic tape 32 runs at relatively high speed from the reel hub 21 mounted on the right-hand reel shaft 18 to the reel hub 21 mounted on the left-hand reel shaft 16. Thus, the magnetic tape 32 is wound around the reel hub 21 on the left-hand reel shaft 16.

Now let us suppose that the fast rewinding mode setting switch in the plurality of tape running mode setting switches 13 of the magnetic tape driving apparatus is depressed.

In this case, the cam member 50 is located in the same position as in the case where the fast-forward mode is established in the magnetic tape driving apparatus. When the fast rewinding mode is established in the magnetic tape driving apparatus, therefore, the tape cassette pushing member 104 downwardly abuts against the housing of the tape cassette 20, and the tape guide 160 is brought into contact with the back of the magnetic tape 32. At the same time, the magnetic tape 32 is fitted in the tape guide indentation of the tape guide 160, so that the two end faces of the tape guide indentation are individually in contact with the longitudinal edges of the magnetic tape 32.

When the magnetic tape driving apparatus is set in the fast rewinding mode, the electric circuit in the apparatus causes the third motor 74 of FIG. 8 to rotate the first small gear 78 in the counterclockwise direction of FIG. 9 at relatively high speed. Then, the rotatory force of the first small gear 78 causes the second small gear 94 to mesh with the gear 92 on the right-hand reel shaft 18, thereby rotating the reel shaft 18 in the counterclockwise direction of FIG. 9 at relatively high speed.

Having its two longitudinal edges in slide contact with the two end faces of the tape guide indentation of the tape guide 160, the magnetic tape 32 runs at relatively high speed from the reel hub 21 mounted on the left-hand reel shaft 16 to the reel hub 21 mounted on the right-hand reel shaft 18. Thus, the magnetic tape 32 is wound around the reel hub 21 on the right-hand reel shaft 18.

When the fast-forward or fast rewinding mode is established in the magnetic tape driving apparatus, the tape guide 160 is brought into contact with the back of the magnetic tape 32 so that the magnetic tape 32 is fitted in the tape guide indentation of the tape guide 160 in the aforesaid manner. Having its two longitudinal edges in slide contact with the two end faces of the tape guide indentation, the magnetic tape 32 runs at relatively high speed to be wound around the reel hub 21 mounted on the left- or right-hand reel shaft 16 or 18. This indicates that the magnetic tape 32 never vibrates transversely in the housing of the tape cassette 20 while the fast-forward or fast rewinding mode is established in the magnetic tape driving apparatus.

Thus, the magnetic tape 32 wound around the reel hub 21 will suffer no irregular winding, such as uneven winding density or steps or biasing along the axis of the reel hub 21.

Now let us suppose that the stop mode setting switch out of the plurality of the tape running mode setting switches 13 of the magnetic tape driving apparatus is depressed.

Then, the second motor 51 is rotated in the clockwise direction of FIG. 8 by the electric circuit in the magnetic tape driving apparatus, so that the cam member 50 is also rotated clockwise. When the cam member 50 rotates to the position shown in FIG. 10, the rotation position detecting means 53 produces a stop mode setting position signal. Receiving this signal, the electric circuit in the magnetic tape driving apparatus stops the rotation of the first to third motors. The position of the cam member 50 at this time is the third position of the cam member 50.

Figure 10:
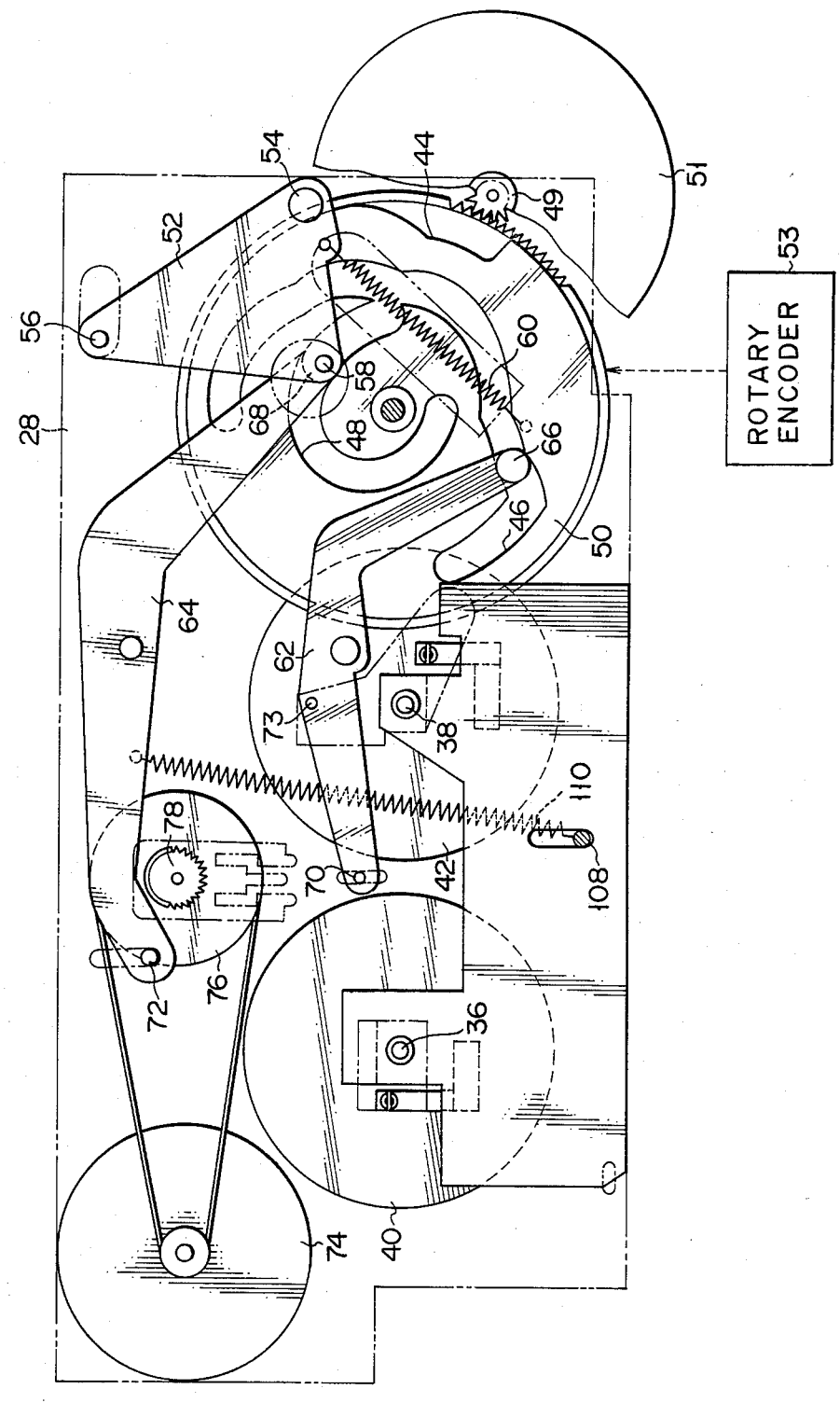
FIG. 10 is a front view similar to FIG. 3 showing a state in which a stop mode is established in the magnetic tape driving apparatus.

When the cam member 50 is located in the stop mode setting position, as shown in FIG. 10, the first cam guide member 52, having its first pin 54 guided by the first guide groove 44, is located in the same position as the fast-forwad or fast rewinding mode setting position, as shown in FIG. 8.

Figure 11:
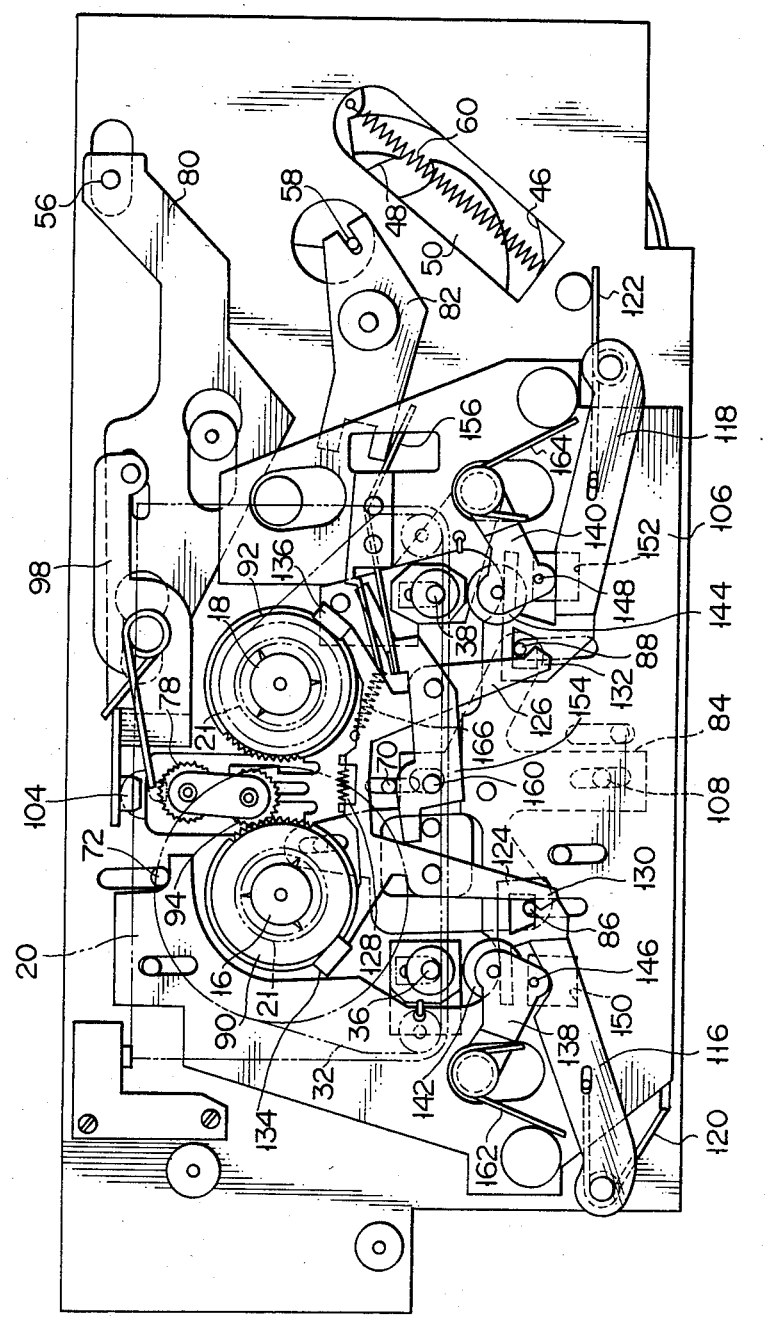
FIG. 11 is a front view similar to FIG. 7 showing the state in which the stop mode is established in the magnetic tape driving apparatus.

Accordingly, the tape cassette pushing member 104 of the fourth linkage lever 98 is downwardly pressed against the housing of the tape cassette 20, as shown in FIG. 11. Since the second linkage lever 82 is kept in the position shown in FIG. 9, the ejecting device 22 shown in FIG. 2 is kept fixed to its first position. As in the case of the fast-forward or fast rewinding mode setting, as shown in FIG. 9, the tape guide 160 fixed to the seventh linkage lever 154 is also held against the back of the magnetic tape 32. Also, the magnetic tape 32 is fitted in the tape guide indentation of the tape guide 160, and the two end faces of the tape guide indentation continue to be in contact with the two longitudinal edges of the magnetic tape.

Having its first pin 66 guided by the second guide groove 46 of the rotated cam member 50, the second cam guide member 62 rotates counterclockwise from the position shown in FIG. 8. The second pin 70 of the second cam guide member 62 thus rotated moves downward from the position of FIG. 8 to be located off and below the lower edges of the overlapping portions of the rightwardly extending section of the first brake lever 124 and the leftwardly extending section of the second brake lever 126, as shown in FIG. 11. The position of the second cam guide member 62 at this time is a second position thereof.

Accordingly, the first and second brake levers 124 and 126 are rotated in the clockwise and counterclockwise directions, respectively, of FIG. 9 by the urging force of the urging means 128. The braking friction member 134 of the first brake lever 126 rotated in this manner abuts against the outer peripheral surface of the gear 90 on the left-hand reel shaft 16, as shown in FIG. 11, to stop the rotation of the reel shaft 16. Likewise, the braking friction member 136 of the rotated second brake lever 128 abuts against the outer peripheral surface of the gear 92 on the right-hand reel shaft 18 to stop the rotation of the reel shaft 18.

When the cam member 50 is located in the stop mode setting position, as shown in FIG. 10, the third cam guide member 64, having its first pin 68 guided by the third guide groove 48, is located in the same position as the fast-forward or fast rewinding mode setting position, as shown in FIG. 8.

Now let us suppose that the cue mode setting switch out of the plurality of the tape running mode setting switches 13 of the magnetic tape driving apparatus is depressed.

Then, the second motor 51 is rotated in the clockwise direction of FIG. 10 by the electric circuit in the magnetic tape driving apparatus, so that the cam member 50 is also rotated clockwise. When the cam member 50 rotates to the position shown in FIG. 12, the rotation position detecting means 53 produces a cue mode setting position signal. Receiving this signal, the electric circuit in the magnetic tape driving apparatus stops the rotation of the second motor 51. The position of cam member 50 at this time is a fourth position thereof.

Figure 12:
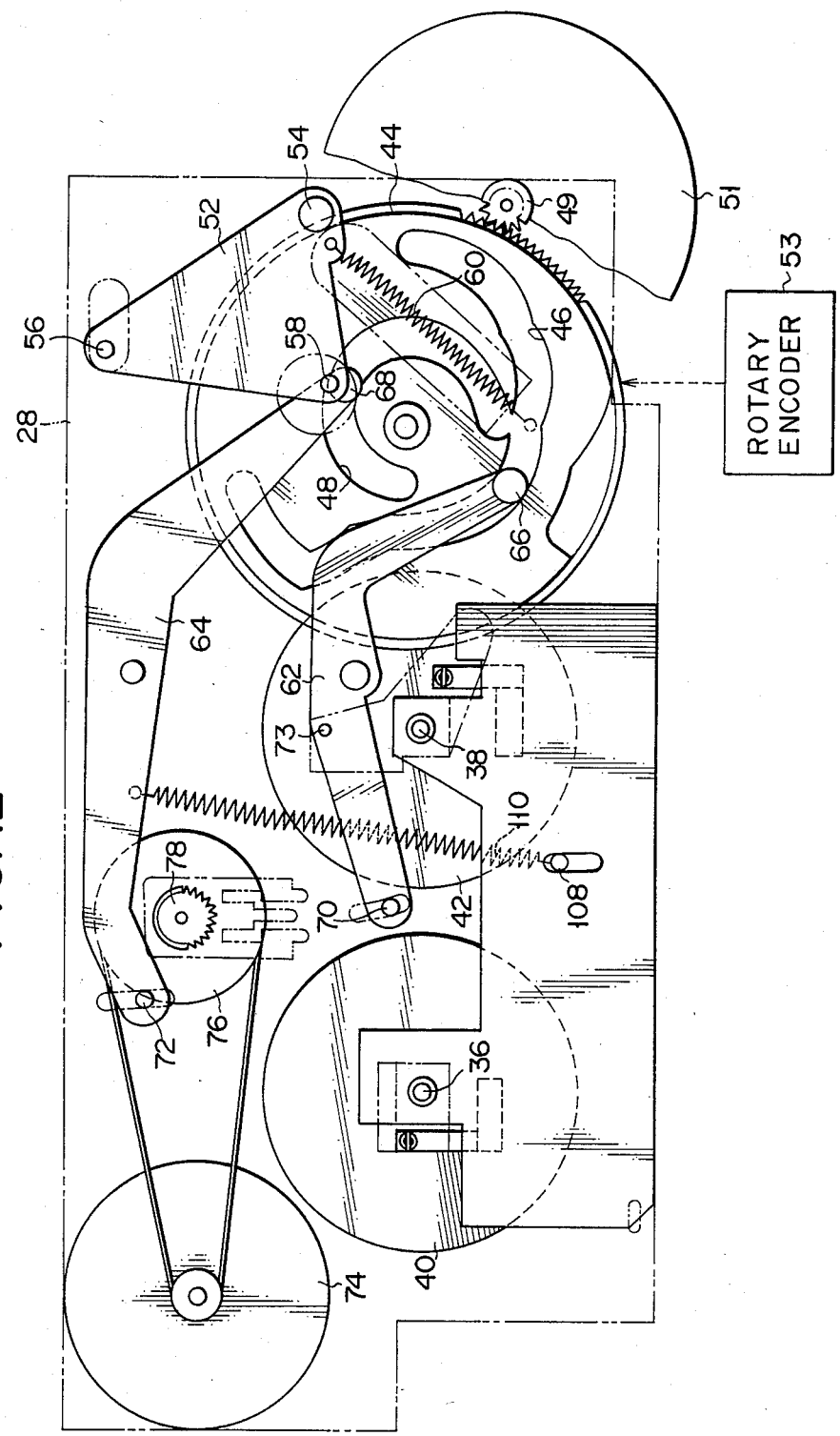
FIG. 12 is a front view similar to FIG. 3 showing a state in which a cue or review mode is established in the magnetic tape driving apparatus.

When the cam member 50 is located in the cue mode setting position, as shown in FIG. 12, the first cam guide member 52, having its first pin 54 guided by the first guide groove 44, is located in the same position as the fast-forward or fast rewinding mode setting position, as shown in FIG. 8.

Figure 13:
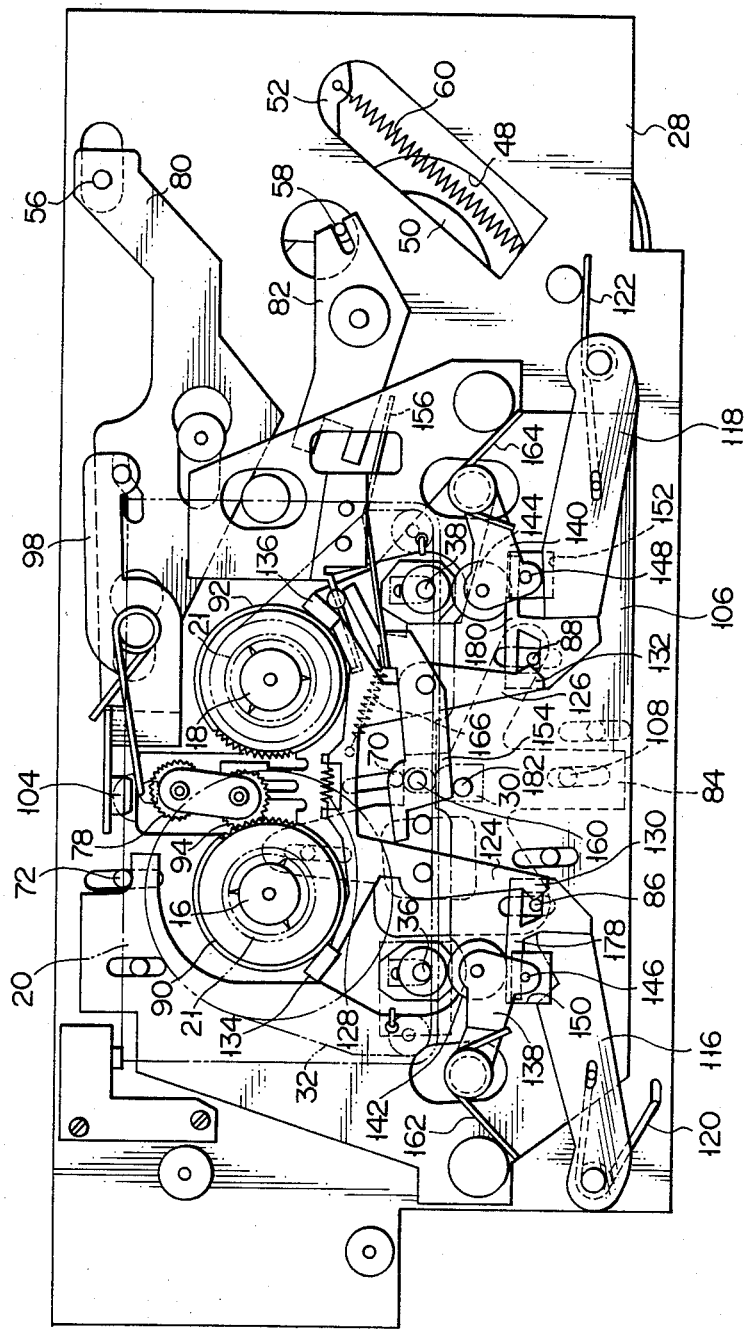
FIG. 13 is a front view similar to FIG. 7 showing the state in which the cue or review mode is established in the magnetic tape driving apparatus.

Accordingly, the tape cassette pushing member 104 of the fourth linkage lever 98 is downwardly pressed against the housing of the tape cassette 20, as shown in FIG. 13. Since the second linkage lever 82 is kept in the position shown in FIG. 9, the ejecting device 22 shown in FIG. 2 is kept fixed to its first position.

Having its first pin 66 guided by the second guide groove 46 of the rotated cam member 50, the second cam guide member 62 rotates counterclockwise from the position shown in FIG. 10. The second pin 70 of the second cam guide member 62 thus rotated moves downward from the position of FIG. 10, thereby pressing the upper edge of the third linkage lever 84, as shown in FIG. 13, to move it downward from the position shown in FIG. 11. The position of the second cam guide member 62 at this time is a third position thereof.

The first and second pins 86 and 88 of the downwardly moved third linkage lever 84 abut against the lower edges of the openings at the other end portions of the fifth and sixth linkage levers 116 and 118, respectively, to rotate the fifth and sixth linkage levers 116 and 118 clockwise and counterclockwise against the urging forces of the urging means 120 and 122, respectively.

As shown in FIG. 13, the upper edge of the other end portion of the rotated fifth linkage lever 116 is spaced from the pin 146 of the left-hand pinch roller retaining lever 138. The pin 146 is brought into contact with the lower edge of an engaging extending section 178 at the other end portion of the fifth linkage lever 116, and is located thereby in the position of FIG. 13 where the pinch roller 142 is separated from the magnetic tape 32, against the urging force of the urging means 162.

The upper edge of the other end portion of the rotated sixth linkage lever 118 is spaced from the pin 148 of the right-hand pinch roller retaining lever 140. The pin 148 is brought into contact with the lower edge of an engaging extending section 180 at the other end portion of the sixth linkage lever 118, and is located thereby in the position of FIG. 13 where the pinch roller 144 is separated from the magnetic tape 32, against the urging force of the urging means 164.

The first and second pins 86 and 88 of the downwardly moved third linkage lever 84, moreover, press the projections 130 and 132 of the first and second brake levers 124 and 126, respectively.

At this time, the first brake lever 124 rotates counterclockwise from the position shown in FIG. 11 against the urging force of the urging means 128, thereby separating the braking friction member 134 from the outer peripheral surface of the gear 90 on the left-hand reel shaft 16, as shown in FIG. 13. The second brake lever 126 rotates clockwise from the position shown in FIG. 11 against the urging force of the urging means 128, thereby separating the braking friction member 136 from the outer peripheral surface of the gear 92 on the right-hand reel shaft 18.

Having its first pin 68 guided by the third guide groove 48 of the rotated cam member 50, the third cam guide member 64 rotates clockwise from the position shown in FIG. 10.

As the second pin 72 of the third cam guide member 64 rotated in this manner moves upward from the position shown in FIG. 10, the auxiliary chassis 106 also moves upward from the position shown in FIG. 10 by the urging force of the urging means 110 shown in FIG. 10. The position of the third cam guide member 64 at this time is a second position thereof.

As shown in FIG. 13, the peripheral edges of the openings 150 and 152 of the upwardly moved auxiliary chassis 106 are spaced from the pins 146 and 148 of the left- and right-hand pinch roller retaining levers 138 and 148, respectively.

A pin 182 protruding from the front of the upwardly moved auxiliary chassis 106 is upwardly pressed against the lower edge of the seventh linkage lever 154. The tape guide 160 of the seventh linkage lever 154 thus pressed by the pin 182 moves upward from the position shown in FIG. 11 to be separated from the magnetic tape 32, as shown in FIG. 11.

The moment the cam member 50 is located in the cue mode setting position, the electric circuit in the magnetic tape driving apparatus causes the third motor 74 shown in FIG. 12 to rotate the first small gear 78 clockwise at relatively high speed. In this case, the first motor is kept from rotating. As in the case where the fast-forward mode is established in the magnetic tape driving apparatus, therefore, the magnetic tape 32 runs at relatively high speed from the reel hub 21 mounted on the right-hand reel shaft 18 to the left-hand reel shaft 16 which is driven by the third motor 74 with the aid of the first and second small gears 78 and 94. Thus, the magnetic tape 32 is wound around the reel hub 21 on the left-hand reel shaft 16.

Figure 14:
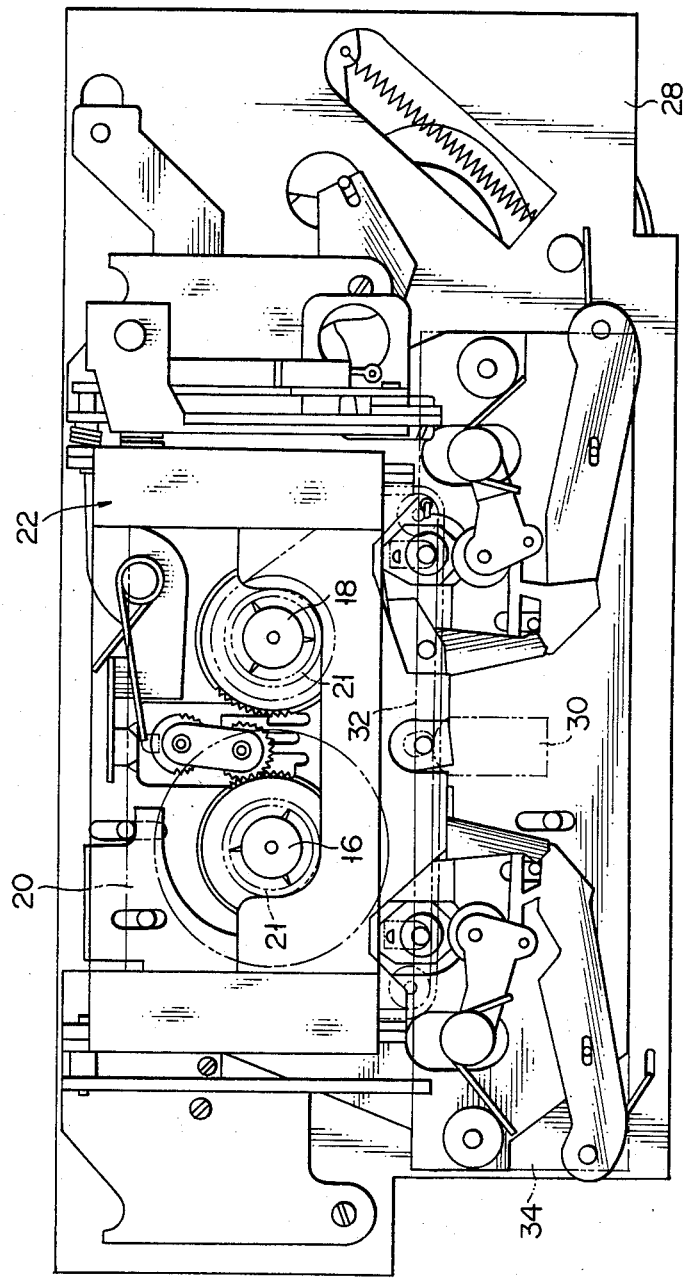
FIG. 14 is a front view similar to FIG. 2 showing the state in which the cue or review mode is established in the magnetic tape driving apparatus.

When the auxiliary chassis 106 moved upward from the position of FIG. 11 is located in the position shown in FIG. 13, only the monitor head 30 mounted on the magnetic head supporting base 34 fixed to the auxiliary chassis 106 is inserted in the central magnetic head-pinch roller insertion opening of the tape cassette 20 to be brought into contact with the magnetic tape 32 as shown in FIG. 14. Then, the monitor head 30 reproduces information previously recorded on the magnetic tape 32 running at relatively high speed. Although brought very close to the magnetic tape 32, the reproducing and recording heads do not touch the magnetic tape 32.

Now let it be supposed that the review mode setting switch out of the plurality of the tape running mode setting switches 13 of the magnetic tape driving apparatus is depressed.

The review mode is established under the same conditions as the cue mode except that the third motor 74 rotates the first small gear 78 clockwise at relatively high speed for the review mode.

Accordingly, the monitor head 30 inserted in the central insertion opening of the tape cassette 20 and in contact with the magnetic tape 32, as shown in FIG. 14, reproduces the information previously recorded on the magnetic tape 32 running at relatively high speed from the reel hub 21 mounted on the left-hand reel shaft 16 to the reel hub 21 mounted on the right-hand reel shaft 18.

When the cue or review mode is established in the magnetic tape driving apparatus, the monitor head 30 is inserted in the central insertion opening of the tape cassette 20 to be brought into contact with the magnetic tape 32, as mentioned above. Thus, the magnetic tape 32 is not held between the pressure-contact pads and the monitor head 30. Although touched by the monitor head 30, therefore, the magnetic tape 32 can run at relatively high speed without producing any great frictional force, and can hence be protected against breakage of its magnetic film and elongation of its base.

A start search mode is a kind of the cue or review mode. Therefore, the aforementioned effect may be obtained also when the start search mode is established in the magnetic tape driving apparatus.

Now let us suppose that the pause mode setting switch out of the plurality of the tape running mode setting switches 13 of the magnetic tape driving apparatus is depressed.

Then, the second motor 51 is rotated in the clockwise direction of FIG. 12 by the electric circuit in the magnetic tape driving apparatus, so that the cam member 50 is also rotated clockwise. When the cam member 50 rotates to the position shown in FIG. 15, the rotation position detecting means 53 produces a pause mode setting position signal. Receiving this signal, the electric circuit in the magnetic tape driving apparatus stops the rotation of the second motor 51. The position of the cam member 50 at this time is a fifth position of the cam member 50. When the pause mode is established in the magnetic tape driving apparatus, the first and third motors 74 are kept from rotating.

Figure 15:
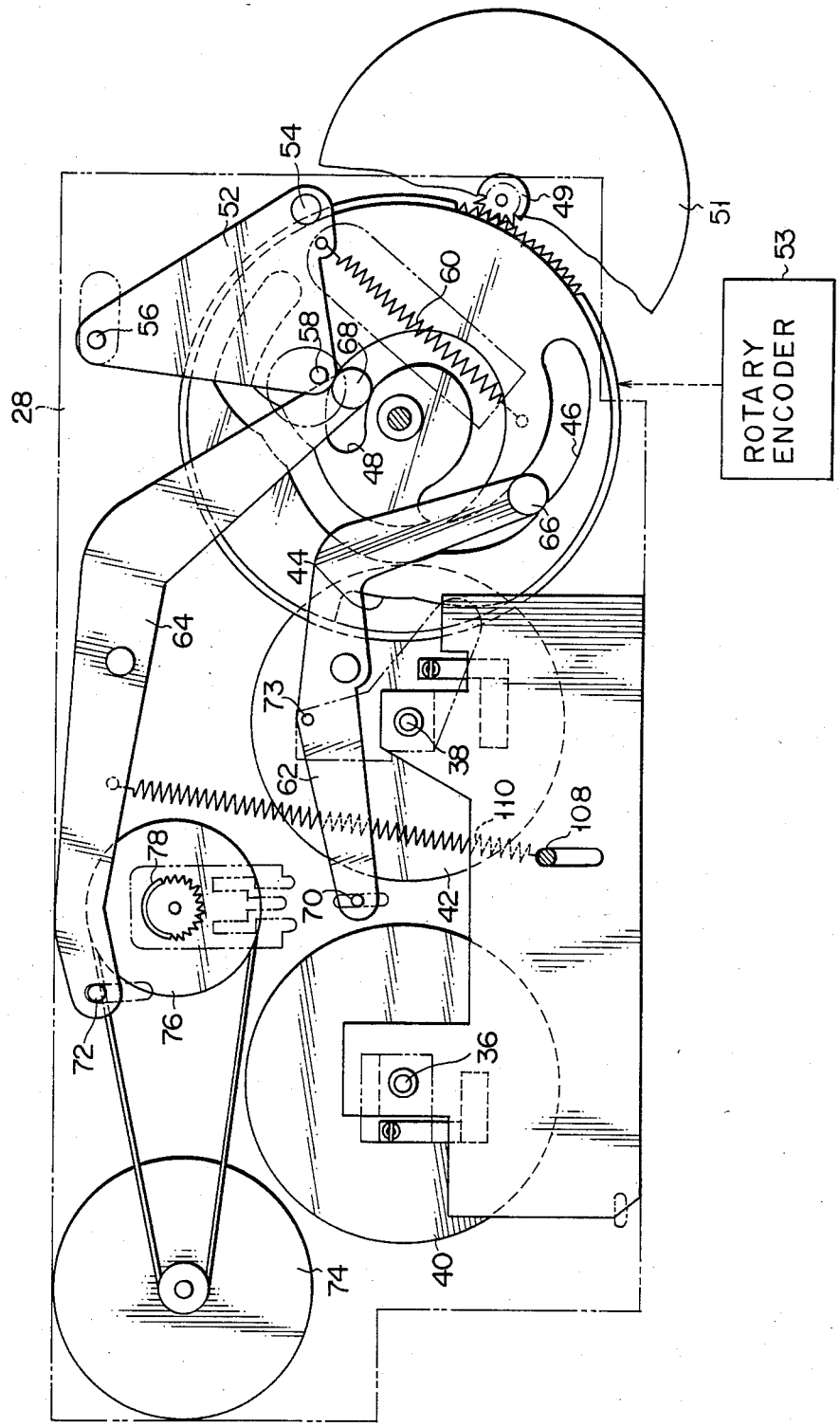
FIG. 15 is a front view similar to FIG. 3 showing a state in which a pause mode is established in the magnetic tape driving apparatus.

When the cam member 50 is located in the pause mode setting position, as shown in FIG. 15, the first cam guide member 52, having its first pin 54 guided by the first guide groove 44, is located in the same position as the fast-forwad or fast rewinding mode setting position, as shown in FIG. 8.

Figure 16:
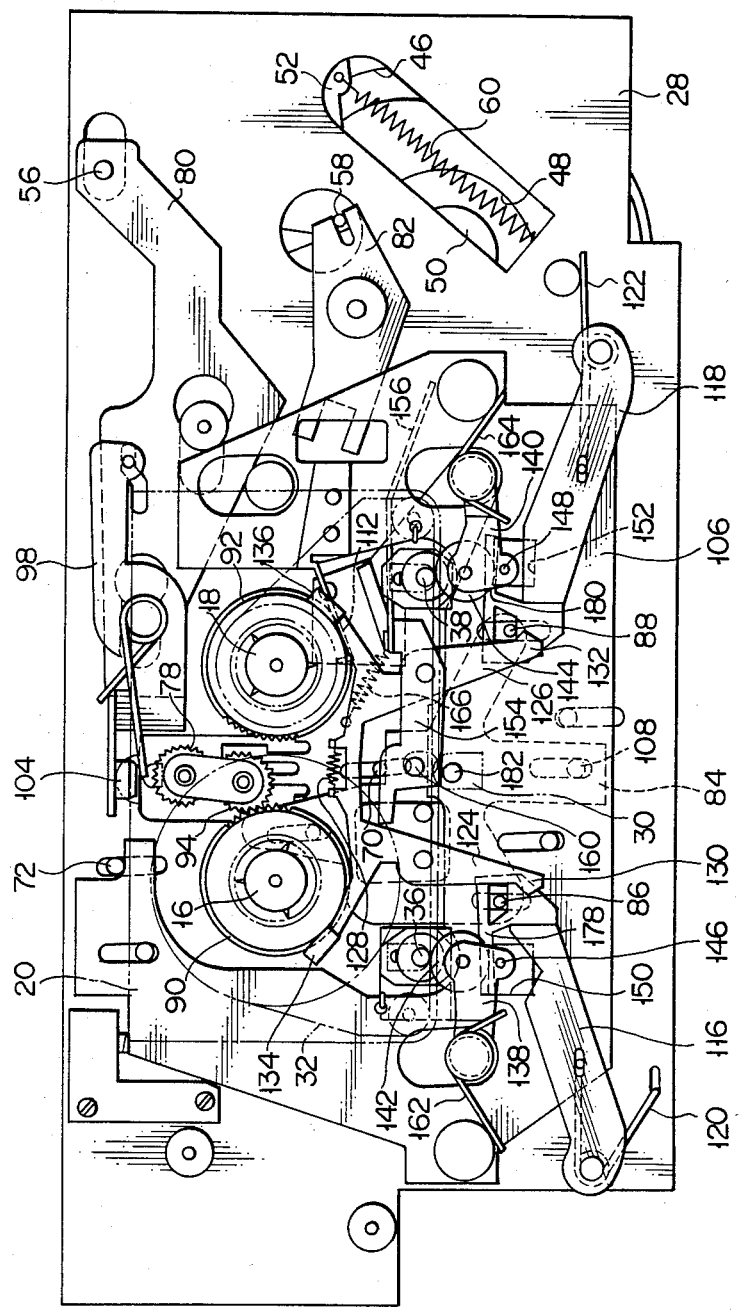
FIG. 16 is a front view similar to FIG. 7 showing the state in which the pause mode is established in the magnetic tape driving apparatus.

Accordingly, the tape cassette pushing member 104 of the fourth linkage lever 98 is downwardly pressed against the housing of the tape cassette 20, as shown in FIG. 16. Since the second linkage lever 82 is kept in the position shown in FIG. 9, the ejecting lever 22 shown in FIG. 2 is kept fixed to its first position.

Having its first pin 66 guided by the second guide section 46 of the rotated cam member 50, the second cam guide member 62 rotates clockwise from the position shown in FIG. 12. The second pin 70 of the second cam guide member 62 thus rotated moves upward from the position of FIG. 12. The position of the second cam guide member 62 at this time is a fourth position thereof.

As the second pin 70 of the second cam guide member 62 moves upward, the urging forces of the urging means 120 and 122 for the fifth and sixth linkage levers 116 and 118 are transmitted to the third linkage lever 84 through the contact between the first pin 86 and the lower edge of the opening at the other end portion of the fifth linkage lever 116 and between the second pin 88 and the lower edge of the opening at the other end portion of the sixth linkage lever 118. Subjected to these urging forces, the third linkage lever 84 rises to the position where its upper edge is in contact with the second pin 70 of the second cam guide member 62, as shown in FIG. 16.

As the third linkage lever 84 rises, the first and second pins 86 and 88 of the third linkage lever 84 move upward from the position shown in FIG. 13. Then, the first and second pins 86 and 88 are spaced from the projections 130 and 132 of the first and second brake levers 124 and 126, respectively, as shown in FIG. 16.

Since the second pin 70 of the second cam guide member 62 is located off and below the overlapping portions of the rightwardly extending section of the first brake lever 124 and the leftwardly extending section of the second brake lever 126, as shown in FIG. 16, the first brake lever 124 is rotated clockwise from the position shown in FIG. 14 by the urging force of the urging means 128. Thus, the braking friction member 134 is brought into contact with the outer peripheral surface of the gear 90 on the left-hand reel shaft 16 to stop the rotation of the reel shaft 16. The second brake lever 126 is rotated counterclockwise from the position shown in FIG. 13 by the urging force of the urging means 128. Thus, the braking friction member 136 is brought into contact with the outer peripheral surface of the gear 92 on the right-hand reel shaft 18 to stop the rotation of the reel shaft 18.

As the fifth linkage lever 116 rotates counterclockwise from the position shown in FIG. 13 to move the engaging extending section 178 upward from the position shown in FIG. 13, the left-hand pinch roller retaining lever 138 is rotated counterclockwise from the position of FIG. 13 by the urging force of the urging means 162. Thus, the pinch roller 142 is brought into contact with the magnetic tape 32, as shown in FIG. 16, and the magnetic tape 32 is held between the pinch roller 142 and the capstan 36 by the relatively weak force of the urging means 162.

As the sixth linkage lever 118 rotates clockwise from the position shown in FIG. 13 to move the engaging extending section 180 upward from the position shown in FIG. 13, the right-hand pinch roller retaining lever 140 is rotated clockwise from the position of FIG. 13 by the urging force of the urging means 164. Thus, the pinch roller 144 is brought into contact with the magnetic tape 32, as shown in FIG. 16, and the magnetic tape 32 is held between the pinch roller 144 and the capstan 38 by the relatively weak force of the urging means 164.

At this time, the pin 146 of the left-hand pinch roller retaining lever 138 is spaced from the upper edge of the other end portion of the fifth linkage lever 116 and the lower edge of the engaging extending section 178, as shown in FIG. 16. Also, the pin 148 of the right-hand pinch roller retaining lever 140 is spaced from the upper edge of the other end portion of the sixth linkage lever 118 and the lower edge of the engaging extending section 180.

Having its first pin 68 guided by the third guide groove 48 of the rotated cam member 50, the third cam guide member 64 rotates clockwise from the position shown in FIG. 12. As the second pin 72 of the third cam guide member 64 rotated in this manner moves upward from the position shown in FIG. 12, the auxiliary chassis 106 also moves upward from the position shown in FIG. 12 by the urging force of the urging means 110. The position of the third cam guide member 64 at this time is a third position thereof.

As the auxiliary chassis 106 rises, the seventh linkage lever 154, whose lower edge is touched by the pin 182 of the auxiliary chassis 106, rotates clockwise from the position shown in FIG. 13. The tape guide 160 of the rotated seventh linkage lever 154 is separated from the magnetic tape 32.

As the auxiliary chassis 106 moves upward from the position shown in FIG. 13, moreover, the monitor head 30 and the reproducing and recording heads mounted on the magnetic head supporting base 34 fixed to the auxiliary chassis 106 are inserted in the magnetic head-pinch roller insertion openings in the housing of the tape cassette 20 to be brought into contact with the magnetic tape 32.

When the auxiliary chassis 106 is located in the position shown in FIG. 16, the peripheral edges of the openings 150 and 152 of the auxiliary chassis 106 are spaced from the pins 146 and 148 of the pinch roller retaining levers 138 and 140, respectively. The engaging claw 112 of the auxiliary chassis 106 engages the auxiliary gear coupled with the gear 92 on the right-hand reel shaft 18.

Now let us suppose that the playback mode setting switch out of the plurality of the tape running mode setting switches 13 of the magnetic tape driving apparatus is depressed.

Then, the second motor 51 is rotated in the clockwise direction of FIG. 15 by the electric circuit in the magnetic tape driving apparatus, so that the cam member 50 is also rotated clockwise. When the cam member 50 rotates to the position shown in FIG. 17, the rotation position detecting means 53 produces a playback mode setting position signal. Receiving this signal, the electric circuit in the magnetic tape driving apparatus stops the rotation of the second motor 51. The position of the cam member 50 at this time is a sixth position thereof.

Figure 17:
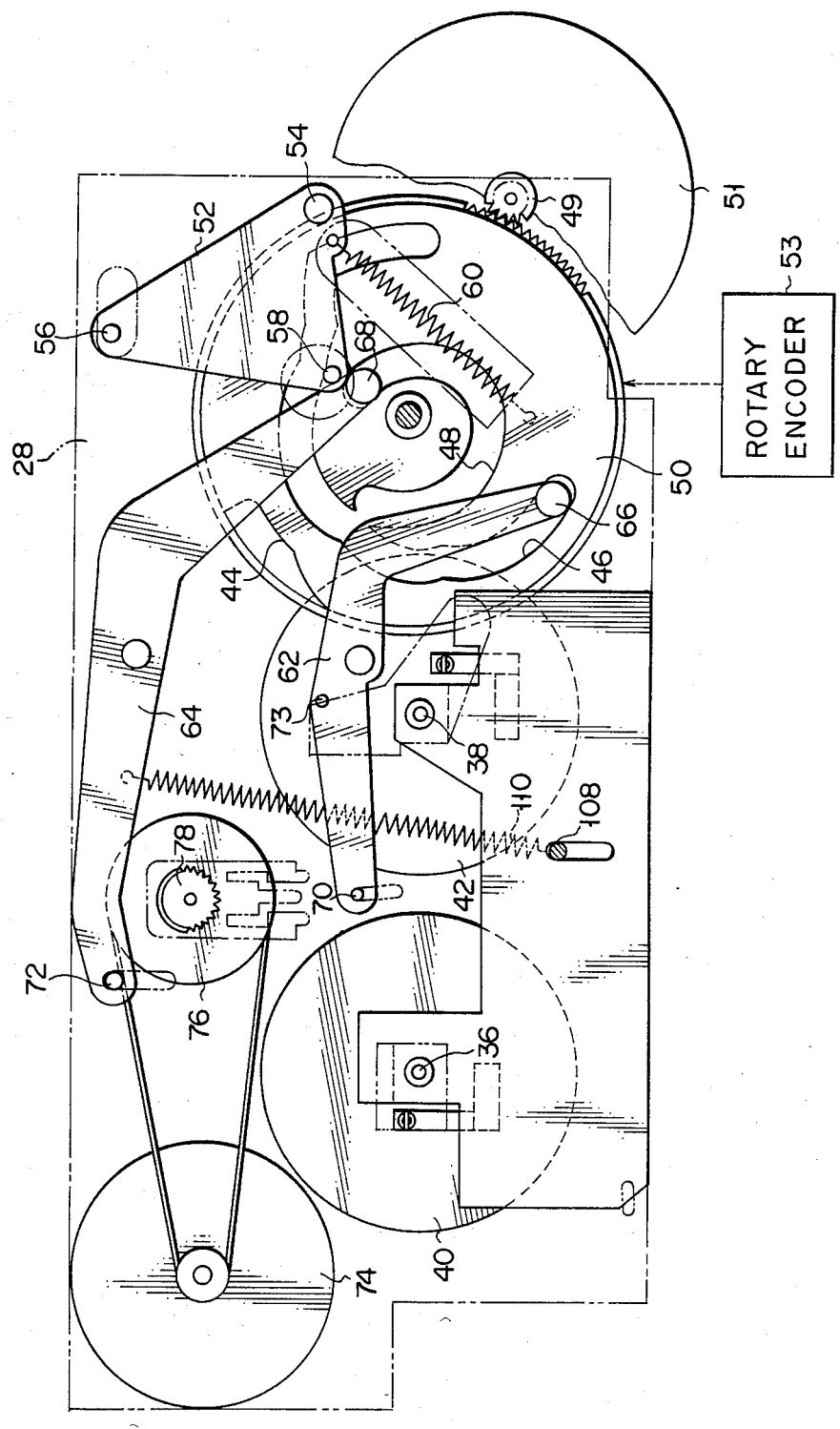
FIG. 17 is a front view similar to FIG. 3 showing a state in which a playback or recording mode is established in the magnetic tape driving apparatus.

When the cam member 50 is located in the playback mode setting position, as shown in FIG. 17, the first cam guide member 52, having its first pin 54 guided by the first guide groove 44, is located in the same position as the fast-forward or fast rewinding mode setting position, as shown in FIG. 8.

Figure 18:
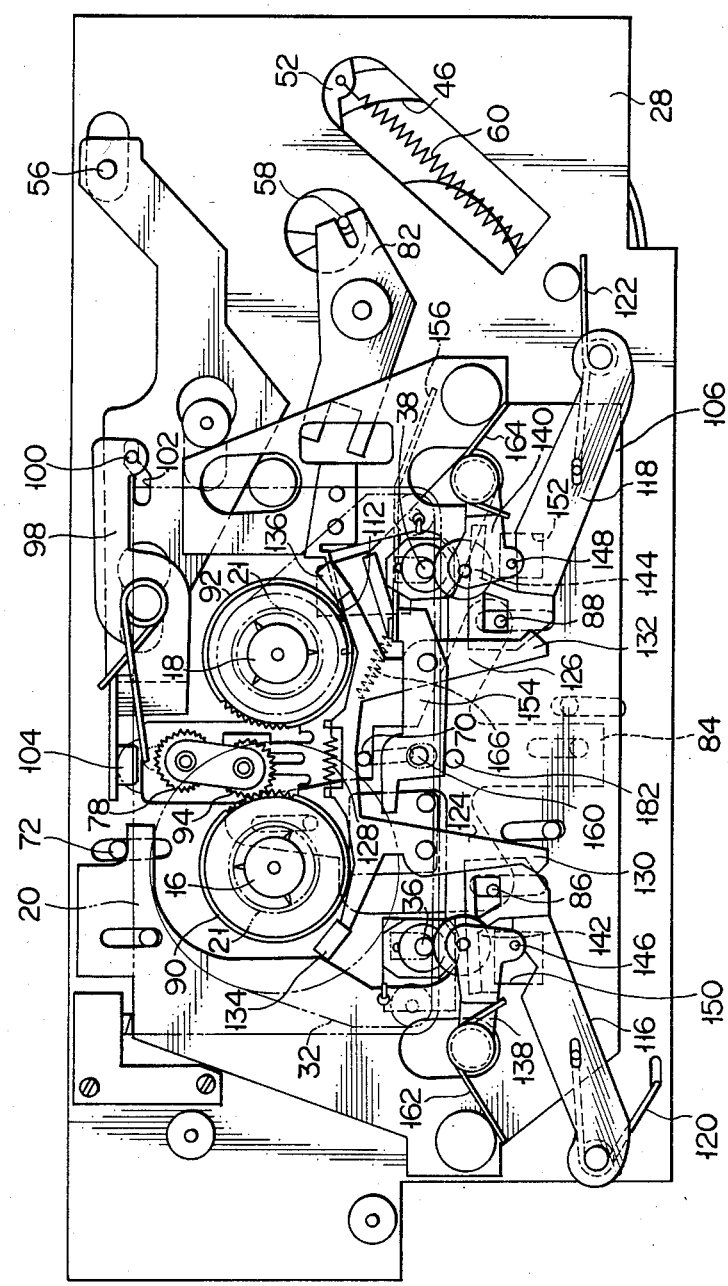
FIG. 18 is a front view similar to FIG. 7 showing the state in which the playback or recording mode is established in the magnetic tape driving apparatus.

Accordingly, the tape cassette pushing member 104 of the fourth linkage lever 98 is downwardly pressed against the housing of the tape cassette 20, as shown in FIG. 18. Since the second linkage lever 82 is kept in the position shown in FIG. 9, the ejecting device 22 shown in FIG. 2 is kept fixed to its first position.

Having its first pin 68 guided by the third guide groove 48 of the rotated cam member 50, the third cam guide member 64 is kept in the position for the pause mode, as shown in FIG. 15.

Having its first pin 66 guided by the second guide groove 46 of the rotated cam member 50, the second cam guide member 62 rotates clockwise from the position shown in FIG. 15. The second pin 70 of the second cam guide member 62 thus rotated moves upward from the position of FIG. 15 to abut against the lower edges of the overlapping portions of the rightwardly extending section of the first brake lever 124 and the leftwardly extending section of the second brake lever 126, as shown in FIG. 18. The position of the second cam guide member 62 at this time is the first position thereof. Then, the first brake lever 124 rotates in the counterclockwise direction of FIG. 16 against the urging force of the urging means 128 to separate the braking friction member 134 from the outer peripheral surface of the gear 90 on the left-hand reel shaft 16. The second brake lever 126 rotates in the clockwise direction of FIG. 16 against the urging force of the urging means 128 to separate the braking friction member 136 from the outer peripheral surface of the gear 92 on the right-hand reel shaft 18.

As the second pin 70 of the second cam guide member 62 moves upward, the urging forces of the urging means 120 and 122 for the fifth and sixth linkage levers 116 and 118 are transmitted to the third linkage lever 84 through the contact between the first pin 86 and the lower edge of the opening at the other end portion of the fifth linkage lever 116 and between the second pin 88 and the lower edge of the opening at the other end portion of the sixth linkage lever 118. Subjected to these urging forces, the third linkage lever 84 rises until the upper edges of the other end portions of the fifth and sixth linkage levers 116 and 118 abut against the pins 146 and 148 of the left- and right-hand pinch roller retaining members 138 and 140, respectively, as shown in FIG. 18.

As the upper edge of the other end portion of the fifth linkage lever 116 abuts against the pin 146 of the left-hand pinch roller retaining member 138, as shown in FIG. 18, the left-hand pinch roller retaining member 138, which has been pressing the pinch roller 142 against the magnetic tape 32 with the aid of the urging means 162 exhibiting a relatively weak force, is brought into contact with the magnetic tape 32 by the urging force of the urging means 120 for the fifth linkage lever 116, as well as by the urging force of the urging means 162. Therefore, the magnetic tape 32 can be held between the pinch roller 142 and the capstan 36 with an increased force.

As the upper edge of the other end portion of the sixth linkage lever 118 abuts against the pin 148 of the right-hand pinch roller retaining member 140, as shown in FIG. 18, the right-hand pinch roller retaining member 140, which has been pressing the pinch roller 144 against the magnetic tape 32 with the aid of the urging means 164 exhibiting a relatively weak force, is brought into contact with the magnetic tape 32 by the urging force of the urging means 122 for the sixth linkage lever 118, as well as by the urging force of the urging means 164. Therefore, the magnetic tape 32 can be held between the pinch roller 144 and the capstan 38 with an increased force.

When the cam member 50 is located in the playback mode setting position, as shown in FIG. 17, the first motor rotates the capstans 36 and 38 in the same direction at the same speed. The third motor 74 rotates the first small gear 78 clockwise at relatively low speed.

The right-hand reel shaft 18 rotates with a frictional force produced between the gear 92 and the auxiliary gear engaged with the engaging claw 112 of the auxiliary chassis 106. Thus, the magnetic tape 32 is fed with back tension from the reel hub 21 mounted on the right-hand reel shaft 18 to the right-hand capstan 38, and then travels from the right-hand capstan 38 to the left-hand capstan 36 at fixed speed. Thereafter, the magnetic tape 32 is wound around the reel hub 21 mounted on the left-hand reel shaft 16.

Then, the reproducing head reproduces the information previously recorded on the magnetic tape 32 running from the right-hand capstan 38 to the left-hand capstan 36 at fixed speed.

Now let us suppose that the recording mode setting switch out of the plurality of the tape running mode setting switches 13 of the magnetic tape driving apparatus is depressed.

The recording mode is established under the same conditions as the playback mode except that the recording head works instead of the playback head, and the monitor head 30 functions as an erasing head for the recording mode.

Accordingly, the magnetic head records information on the magnetic tape 32 running from the right-hand capstan 38 to the left-hand capstan 36 at fixed speed.

Although an illustrative embodiment of this invention has been described in detail herein, it is to be understood that the invention is not limited to such embodiment, and that various changes and modifications may be effected therein by one skilled in the art without departing from the scope or spirit of the invention.

According to this invention, the magnetic tape driving apparatus may be of a single-capstan type.

What we claim is:

1. In a magnetic tape driving apparatus in which a magnetic tape (32) is driven with a reel shaft (16 or 18) and a capstan (36 or 38), a mode setting device for establishing various driving modes (i.e., EJECT. START, FF. REW, PLAY. REC, STOP, PAUSE, CUE. REVIEW) of the tape driving apparatus, comprising:

a brake lever (124 or 126) provided with a brake friction member (134 or 136) and being movable between a separating position wherein the brake friction member (134 or 136) is separated from the reel shaft (16 or 18) and a braking position wherein the brake friction member (134 or 136) is in contact with the reel shaft (16 or 18) so as to stop the rotation of the reel shaft (16 or 18);

a pinch roller retaining lever (138 or 140) provided with a pinch roller (142 or 144) and being movable between a non-pinching position wherein the pinch roller (142 or 144) does not pinch the magnetic tape (32) in cooperation with the capstan (36, 38) and a pinching position wherein the pinch roller (142 or 144) pinches the magnetic tape (32) in cooperation with the capstan (36 or 38);

a first urging means (128) for urging the brake lever (124 or 126) toward the braking position thereof;

a second urging means (162 or 164) for urging the pinch roller retaining lever (138 or 140) toward the pinching position thereof;

a first cam guide member (62) coupled to said brake lever and to said pinch roller retaining lever, and being movable among first, second, and third positions, the first cam guide member (62) setting the brake lever (124 or 126) at the separating position when the first cam guide member (62) is located at its first position, the first cam guide member (62) setting the pinch roller retaining lever (138 or 140) at the non-pinching position when the first cam guide member (62) is located at its second position, and the first cam guide member (62) setting the brake lever (124 or 126) at the separating position and setting the pinch roller retaining lever (138 or 140) at the non-pinching position when the first cam guide member (62) is located at its third position;

a second cam guide member (64) coupled to said pinch roller retaining lever, and being movable among first, second, and third positions, the second cam guide member (64) setting the pinch roller retaining lever (138 or 140) at the non-pinching position when the second cam guide member (64) is located at its third position; and a rotary cam member (50) being capable of attaining first through six different and discrete angular positions and being coupled to said first and second cam guide members for guiding said first and second cam guide members (62 or 64) among their respective first to third positions, the cam member (50) guiding the first cam guide member (62) at its first position and the second cam guide member (64) at its third position when the cam (50) is located at its first and second angular positions, the cam member (50) guiding the first cam guide member (62) at its second position and the second cam guide member (64) at its third position when the cam member (50) is located at its third angular position, the cam member (50) guiding the first cam guide member (62) at its third position and the second cam guide member (64) at its second position when the cam member (50) is located at its fourth angular position, the cam member (50) guiding the first cam guide member (62) at its second position and the second cam guide member (64) at its first position when the cam member (50) is located at its fifth angular position, and the cam member (50) guiding the first cam guide member (62) at its first position and the second cam guide member (64) at its first position when the cam member (50) is located at its sixth angular position, so that:

the brake lever (124 or 126) separates the brake friction member (134 or 136) from the reel shaft (16 or 18) against the urging force produced by the first urging means (128) and the pinch roller retaining lever (138 or 140) separates the pinch roller (142 or 144) from the capstan (36 or 38) against the urging force produced by the second urging means (162 or 164) when the cam member (50) is located at its first and second angular positions;

the brake lever (124 or 126) brings the brake friction member (134 or 136) in contact with the reel shaft (16 or 18) by the urging force produced by the first urging means (128) and the pinch roller retaining lever (138 or 140) separates the pinch roller (142 or 144) from the capstan (36 or 38) against the urging force produced by the second urging means (162 or 164) when the cam member (50) is located at its third position;

the brake lever (124 or 126) separates the brake friction member (134 or 136) from the reel shaft (16 or 18) against the urging force produced by the first urging means (128) and the pinch roller retaining lever (138 or 140) separates the pinch roller (142 or 144) from the capstan (36 or 38) against the urging force produced by the second urging means (162 or 164) when the cam member (50) is located at its fifth position; and the brake lever (124 or 126) separates the brake friction member (134 or 136) from the reel shaft (16 or 18) against the urging force produced by the first urging means (128) and the pinch roller retaining lever (138 or 140) makes the pinch roller (142 or 144) pinch the magnetic tape (34) with the capstan (36 or 38) by the urging force produced by the second urging means (162 or 164) when the cam member (50) is located at its sixth angular position.

2. The mode setting device of claim 1, further comprising:

an operating lever (116 or 118) movable between a separating position wherein the operating lever (116 or 118) separates from the pinch roller retaining lever (138 or 140), and a contacting position wherein the operating lever (116 or 118) contacts the pinch roller retaining lever (138 or 140) so as to move the pinch roller retaining lever (138 or 140) to the non-pinching position;

a linkage lever (84) coupled to the operating lever, and being movable among first to third positions, the linkage lever (84) moving the operating lever (116 or 118) to its separating position when the linkage lever (84) is located at its first position, the linkage lever (84) moving the operating lever (116 or 118) to the contacting position when the linkage lever (84) is located at its second and third positions, and the linkage lever (84) being moved to its second and third positions by the first cam guide member (62) according to the location of the first cam guide member (62) to the second and third positions;

an auxiliary operating lever (106) coupled to the second cam guide member (64), and being movable among first to third positions by the second cam guide member (64) according to the location of the second cam guide member (64) to its first to third positions, the auxiliary operating lever (106) moving the pinch roller retaining lever (138 or 140) to its separating position and the linkage lever (84) to the first position when the auxiliary operating lever (106) is located at its third position, the auxiliary operating lever (106) moving the linkage lever (84)

at the first position when the auxiliary operating lever (106), together with the second cam member (64), is located at its first position and the first cam guide member (62) is located at its first position, and the auxiliary operating lever (106) separating from the pinch roller retaining lever (138 or 140) when the auxiliary operating lever (106) is located at its first and second positions.

3. The mode setting device of claim 1, further comprising:

another reel shaft (16 or 18);

another capstan (36 or 38);

another brake lever (124 or 126) provided with a brake friction member (134 or 136) and being movable between a separating position wherein the brake friction member (134 or 136) is separated from the another reel shaft (16 or 18) and a braking position wherein the brake friction member (134 or 136) is in contact with the another reel shaft (16 or 18) so as to stop the rotation of the another reel shaft (16 or 18), urged by the first urging means (128) toward the braking position thereof, and set at its separating position by the first cam guide member (62) located at its first and third positions; and another pinch roller retaining lever (138 or 140) provided with a pinch roller (142 or 144) and being movable between a non-pinching position wherein the pinch roller (142 or 144) does not pinch the magnetic tape (32) in cooperation with the another capstan (36, 38) and a pinching position wherein the pinch roller (142 or 144) pinches the magnetic tape (32) in cooperation with the another capstan (36 or 38), urged at its pinching position by the second urging means (162 or 164), and set at its non-pinching position by the first cam guide member (62) located at its second and third positions and by the second cam guide member (64) located at its third position;

whereby both brake levers (124 and 126) separate the brake friction members (134 and 136) from both reel shafts (16 and 18) against the urging force produced by the first urging means (128) and both pinch roller retaining levers (138 and 140) separate both pinch rollers (142 and 144) from both capstans (36 and 38) against the urging force produced by the second urging means (162 and 164) when the cam member (50) is located at its first and second angular position; both brake levers (124 or 126) bring the both brake friction members (134 and 136) in contact with both reel shafts (16 and 18) by the urging force produced by the first urging means (128) and both pinch roller retaining levers (138 and 140) separate both pinch rollers (142 and 144) from both capstans (36 and 38) against the urging force produced by the second urging means (162 and 164) when the cam member (50) is located at its third position; both brake levers (124 and 126) separate both brake friction members (134 and 136) from both reel shafts (16 and 18) against the urging force produced by the first urging means (128) and both pinch roller retaining levers (138 and 140) separate both pinch rollers (142 and 144) from both capstans (36 and 38) against the urging force produced by the secohd urging means (162 and 164) when the cam member (50) is located at its fourth position; both brake levers (124 and 126) bring both reel shafts (16 and 18) by the urging force produced by the first urging means (128) and both pinch roller retaining levers (128 and 140) separate both pinch rollers (142 and 144) from both capstans (36 and 38) against the urging force produced by the second urging means (162 or 164) when the cam member (50) is located at its fifth position; and both brake levers (124 and 126) separate both brake friction members (134 and 136) from both reel shafts (16 and 18) against the urging force produced by the first urging means (128) and the pinch roller retaining levers (138 and 140) make both pinch rollers (142 and 144) pinch the magnetic tape (34) with both capstans (36 and 38) by the urging force produced by the second urging means (162 and 164) when the cam member (50) is located at its sixth angular position.

4. The mode setting device of claim 3, further comprising:

a pair of operating levers (116 and 118) movable between a separating position wherein both operating levers (116 and 118) separate from both pinch roller retaining levers (138 and 140) and a contacting position wherein the operating levers (116 and 118) contact the pinch roller retaining levers (138 and 140) so as to move both pinch roller retaining levers (138 and 140) to the non-pinching position;

a linkage lever (84) movable among first to third positions, the linkage lever (84) moving both operating levers (116 and 118) to the separating position when the linkage lever (84) is located at its first position, the linkage lever (84) moving both operating levers (116 and 118) to the contacting position when the linkage lever (84) is located at its second and third positions, and the linkage lever (84) being moved to its second and third positions by the first cam member (62) according to the location of the first cam member (62) to the second and third positions;

an auxiliary operating lever (106) movable among first to third positions by the second cam guide member (64) according to the location of the second cam guide member (64) to the first to third positions, the auxiliary operating lever (106) moving both pinch roller retaining levers (138 and 140) to the separating position and the linkage lever (84) to the first position when the auxiliary operating lever (106) is located at its third position, and the auxiliary operating lever (106) moving the linkage lever (84) at the first position when the auxiliary operating lever (106), together with the second cam guide member (64), is located at its first position and the first cam guide member (62) is located at its first position, and the auxiliary operating lever (106) separating from both pinch roller retaining levers (138 and 140) when the auxiliary operating lever (106) is located at its first and second positions.

* * * * *